(12) United States Patent
Shimanuki

(10) Patent No.: US 7,540,442 B2
(45) Date of Patent: Jun. 2, 2009

(54) APPARATUS FOR THREADING A TAPE FROM A CARTRIDGE

(75) Inventor: Hiroyuki Shimanuki, Tokyo (JP)

(73) Assignee: NEC Corporation, Tokyo (JP)

( * ) Notice: Subject to any disclaimer, the term of this patent is extended or adjusted under 35 U.S.C. 154(b) by 382 days.

(21) Appl. No.: 11/153,325

(22) Filed: Jun. 16, 2005

(65) Prior Publication Data

US 2005/0279873 A1    Dec. 22, 2005

(30) Foreign Application Priority Data

Jun. 17, 2004    (JP) .............................. 2004-179812

(51) Int. Cl.
G03B 1/58    (2006.01)

(52) U.S. Cl. ................. 242/332.4; 242/532.6

(58) Field of Classification Search .............. 242/332.4, 242/332.7, 332, 338, 579, 587.2, 532.6; 360/95
See application file for complete search history.

(56) References Cited

U.S. PATENT DOCUMENTS

| 6,437,938 | B1 |   | 8/2002  | Wada          |           |
|-----------|----|---|---------|---------------|-----------|
| 6,471,150 | B1 | * | 10/2002 | Tsuchiya et al. | 242/332.4 |
| 6,540,167 | B2 |   | 4/2003  | Sasaki et al. |           |
| 6,644,580 | B2 |   | 11/2003 | Sasaki et al. |           |
| 6,889,928 | B2 |   | 5/2005  | Tsuchiya      |           |
| 7,063,286 | B2 |   | 6/2006  | Masuda        |           |
| 2002/0100829 | A1 | | 8/2002 | Sasaki et al. |           |
| 2002/0100831 | A1 | | 8/2002 | Sasaki et al. |           |
| 2004/0099757 | A1 | | 5/2004 | Masuda        |           |
| 2004/0144878 | A1 | | 7/2004 | Tsuchiya      |           |

FOREIGN PATENT DOCUMENTS

| EP | 1 054 396 A2 | 11/2000 |
| EP | 1 098 307 A2 | 5/2001  |
| JP | 62-40655     | 2/1987  |
| JP | 2001-135003  | 8/2001  |
| JP | 2002-216408  | 8/2002  |
| JP | 2002-216409  | 8/2002  |
| JP | 2002-230867  | 8/2002  |
| JP | 3390361      | 1/2003  |
| JP | 3390385      | 1/2003  |
| JP | 2004-171701  | 6/2004  |
| JP | 2004-220713  | 8/2004  |
| JP | 2004-348923  | 12/2004 |

OTHER PUBLICATIONS

Japanese Office Action dated Jun. 9. 2008 with partial English Translation.

* cited by examiner

*Primary Examiner*—William A Rivera
(74) *Attorney, Agent, or Firm*—McGinn IP Law Group, PLLC

(57) ABSTRACT

An apparatus for threading a tape from a cartridge is to be provided. In the apparatus, a leader block rotates to capture a coupling element of the tape, a rod linearly moves to rotate the leader block, and a loader cam gear moves the rod.

12 Claims, 20 Drawing Sheets

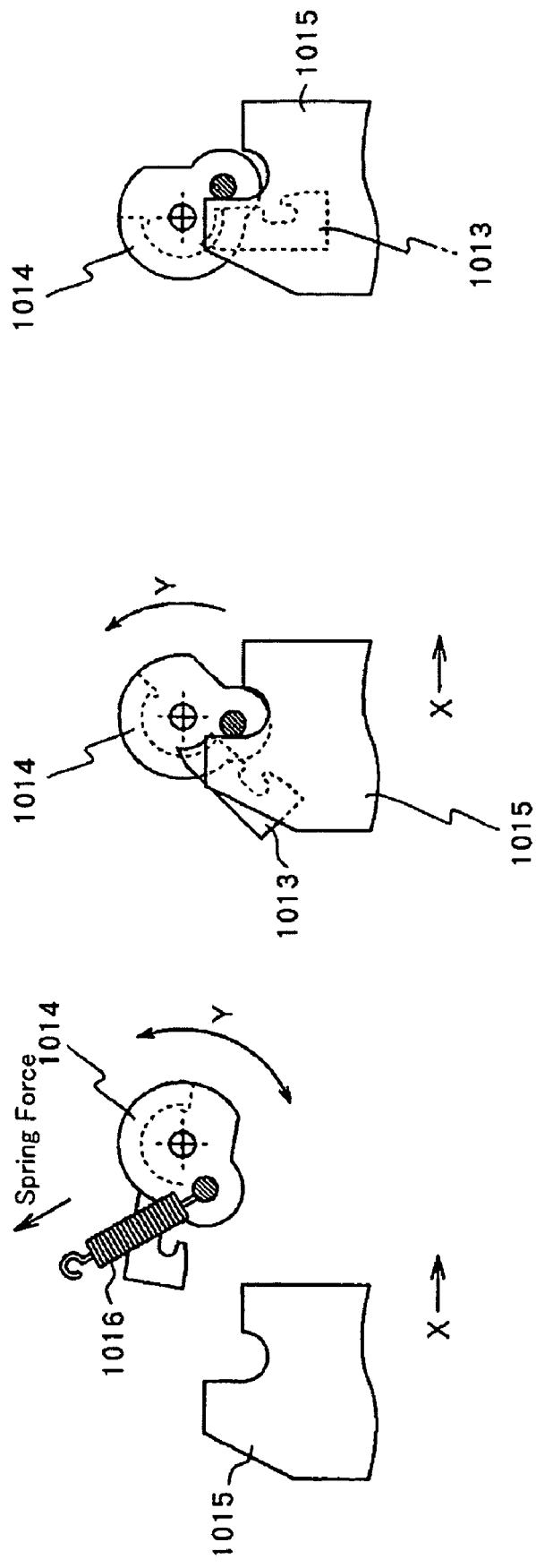

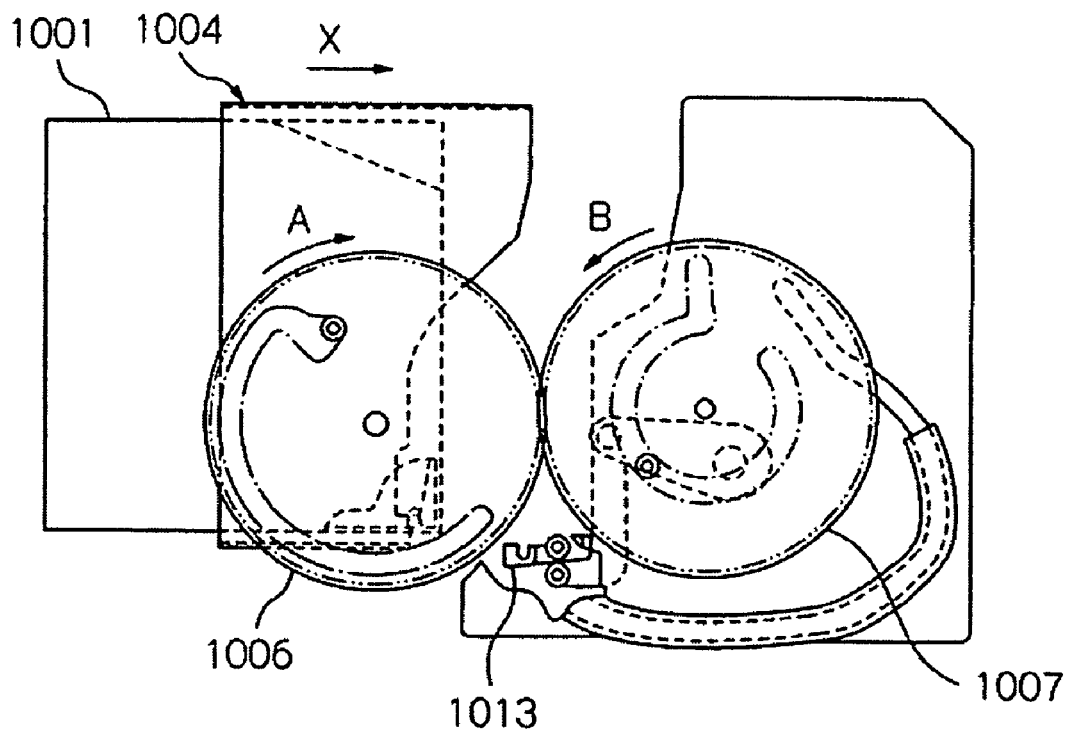
Fig. 5A
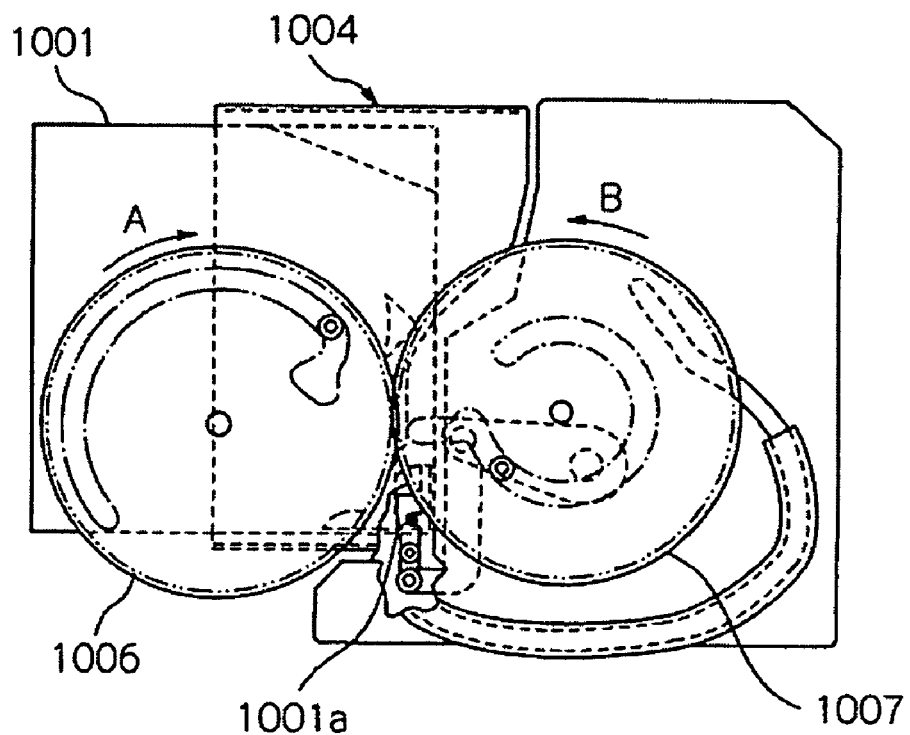
Prior Art      Fig. 5B

Enlarged view of X portion

Enlarged view of X, portion

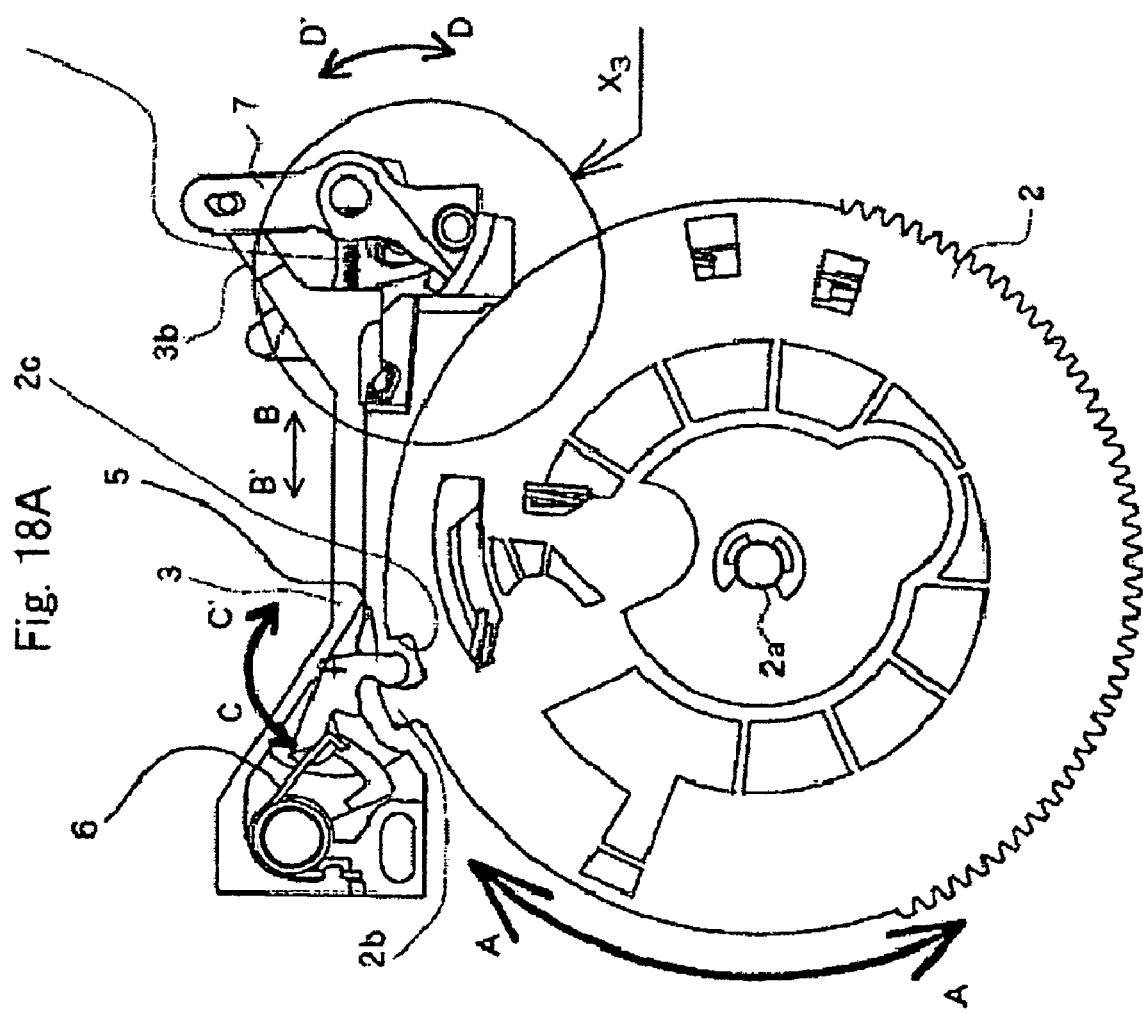
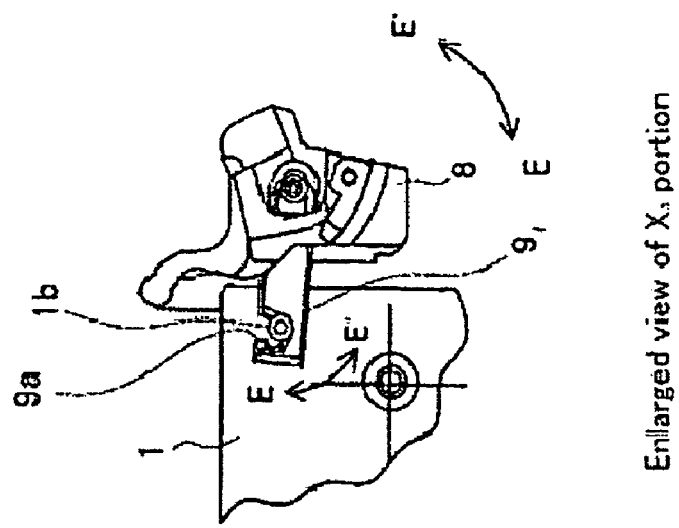
Fig. 18A
Fig. 18B
Enlarged view of $X_1$ portion

APPARATUS FOR THREADING A TAPE FROM A CARTRIDGE

BACKGROUND OF THE INVENTION

1. Field of the Invention

The present invention relates to a leader block rotating mechanism of a cartridge magnetic tape drive.

2. Description of the Related Art

For example, Patent Document 1 discloses a leader block rotating mechanism of a cartridge magnetic tape drive which captures or releases a leader pin of a magnetic tape by rotating a leader block.

FIGS. 1 and 2 show a configuration of a conventional leader block rotating mechanism disclosed in Patent Document 1 and FIGS. 3 and 4 show its working principle. FIG. 3 shows the leader block rotating mechanism from the upside and FIG. 4 shows it from the downside. Moreover, FIG. 5 shows a schematic configuration of the conventional cartridge magnetic tape drive disclosed in Patent Document 1.

As shown in FIGS. 1 and 2, the conventional leader block rotating mechanism is engaged with a protrusion 1014*a* of a retractor table 1014 on which a groove 1013*a* of a leader block 1013 freely rotates while the leader block 1013 is moved and positioned at a capture position.

Then, as shown in FIGS. 3A to 3C and FIGS. 4A to 4C, to capture the leader pin of the magnetic tape by the leader block 1013, a linear motion of a retractor cam 1015 is converted into the rotational motion of the retractor table 1014 by pressing the retractor table 1014 in X direction in FIGS. 3 and 4 by the retractor cam 1015 in the case of the conventional leader block rotating mechanism. Moreover, the leader block 1013 engaged with the retractor table 1014 rotates to capture the leader pin of the magnetic tape by a hook portion 1013*b* of the leader block 1013.

Moreover, to release the leader pin from the hook portion 1013*b*, the operation reverse to the above operation is performed. That is, the retractor cam 1015 moves in the opposite direction and the leader block 1013 is rotated by the tension of a spring 1016 rotating the leader block 1013 in the release direction. Then, the hook portion 1013*b* of the leader block 1013 is removed from the leader pin of the magnetic tape.

By referring to FIGS. 5A and 5B, how the leader block 1013 operates in the conventional cartridge magnetic tape drive disclosed in Patent Document 1 is briefly described below.

As shown in FIG. 5A, when a cartridge 1001 is inserted into a cartridge loader 1004, a loader drive gear 1006 receives a required driving force (driving source is not illustrated) to rotate in the direction of the arrow A. Then, the cartridge loader 1004 linearly moves in the direction of the arrow X to load the cartridge 1001 to a predetermined loading position. However, a threader drive gear 1007 rotates in the direction of the arrow B in accordance with the rotation of the loader drive gear 1006.

When the loader drive gear 1006 further rotates in the direction of the arrow A, the cartridge loader 1004 further slides in the direction of the arrow X. In this case, the retractor cam 1015 (refer to FIG. 3) thrust to the downside of the cartridge loader 1004 presses the retractor pin 1014*b* (refer to FIG. 2) in the direction of the arrow X. Therefore, the retractor table 1014 rotates in the direction of the arrow Y shown in FIGS. 3 and 4 by using a pivoted axis (not illustrated) as a fulcrum.

In this case, because the protrusion 1014*a* and groove 1013*c* are fitted, the leader block 1013 is also rotated in accordance with the rotation of the retractor table 1014. Then, the leader block 1013 is led to the table vent of the cartridge 1001. A state is realized in which the hook 1013*b* is engaged with the leader pin 1001*a* and held from the rear side of the loading direction.

In the case of the above prior art, however, the rotation angle of the leader block 1013 depends on the slide stroke of the retractor cam 1015. Therefore, miscapture of the leader pin or a mechanism component may be broken due to excessive or insufficient rotation of the leader block 1013 depending on adjustment of the slide stroke of the retractor cam 1015. The cartridge loader 1004 to which the retractor cam 1015 is constituted so as to move when the rotational motion of the loader drive gear 1006 in the direction of the arrow A due to a not-illustrated driving source is converted into a linear motion in the direction of the arrow X. Therefore, when considering the "play" of the conversion mechanism, it is difficult to keep the slide stroke of the retractor cam 1015 constant. Therefore, miscapture of the leader pin may occur due to excessive or insufficient rotation of the leader block 1013 depending on operation states of these mechanisms.

Therefore, the present applicant proposes a leader block rotating mechanism of a cartridge magnetic tape drive making it possible to prevent miscapture of a leader pin due to excessive or insufficient rotation of a leader block in Patent Document 2.

By referring to FIGS. 6 to 10, the capture operation of a leader pin by the leader block rotating mechanism disclosed on the Patent Document 2 is described below.

As shown in FIG. 6, when a cartridge (not illustrated) is inserted into a cartridge magnetic tape drive, a motor 2006 is driven and a loader cam gear 2005 rotates in the positive direction, that is, A direction. When the loader cam gear 2005 rotates, the cartridge is positioned to a proper position, that is, a position where a leader block 2012 can capture a leader pin (not illustrated) by the conventional technique disclosed in Patent Document 1. This operation is the so-called cartridge loading.

When the loading is completed, the leader block 2012 moves from E' direction to E direction along a guide groove 2004*a* of a cam plate 2004 (by a power source different from the motor 2006) and is positioned in a leader block picker 2011. As shown in FIG. 7, a protrusion 2012*a* of the leader block 2012 is engaged with a guide groove 2011*a* of the leader block picker 2011 and stopped.

Thereafter, the loader cam gear 2005 further rotates and thereby, a capture cam 2005*a* at the circumferential portion of the loader cam gear 2005 slide-contacts with a second protrusion 2007*a* of a rotator cam 2007 as shown in FIG. 6 or 9 and the second protrusion 2007*a* engages with an engagement portion 2005*b*. Then, as shown in FIG. 8, the rotator cam 2007 rotates in C direction, that is, capture direction against the tension of a spring 2008 serving as urging means. Then, a torsional coil spring 2009 mounted on the rotator cam 2007 also rotates in the C direction. Therefore, a hook portion 2009*a* of the torsional coil spring 2009 presses a protrusion 2010*a* of a rotator lever 2010 to rotate the rotator lever 2010 in D direction in FIG. 8.

Because the rotator lever 2010 and leader block picker 2011 are mutually interlocked in rotational operation, the leader block picker 2011 also rotates in the D direction in FIG. 8 in accordance with the rotation of the rotator lever 2010 in the D direction. The leader block 2012 held in the leader block picker 2011 also rotates in the D direction and as shown in FIG. 10, a leader pin 2001*a* of the magnetic tape is captured by a hook portion 2012*b* at the front end of the leader block 2012.

The torsional coil spring 2009 serving as excessive-rotation absorbing means mounted on the rotator cam 2007 is automatically elastically deformed and inflected into a state shown in FIG. 10 when a force equal to or more than a certain force acts. The torsional coil spring 2009 makes only the rotation of the rotator cam 2007 possible while holding attitudes of the leader block picker 2011, rotator lever 2010, and leader block 201 at the present positions. Therefore, even when the rotator cam 2007 excessively rotates or the rotation of the rotator lever 2010 is inhibited because a stack occurs when capturing the leader pin 2001a, it is possible to prevent such problem as damage of the mechanism portion of the leader block picker 2011, rotator lever 2010, leader block 2012, loader cam gear 2005, or rotator cam 2007 and moreover, a problem such as an overload of the motor 2006.

Thus, in the case of the configuration in Patent Document 2, excessive-rotation of the rotator cam 2007 does not become a substantial problem. Therefore, delicate adjustments of the rotation stop position of the loader cam gear 2005 and the rotational value of the rotator cam 2007 at the time of capture become completely unnecessary. Moreover, by previously designing the rotator cam 2007 so that a slight excessive-rotation occurs, for example, by excessive-traveling and rotating the loader cam gear 2005, it is possible to securely prevent a problem that miscapture of a leader pin occurs due to insufficient rotation of the rotator cam 2007.

Patent Document 1 Japanese Patent Laid-Open No. 2001-135003

Patent Document 2 Japanese Patent Application No. 2003-008312

However, in the case of the configuration in the above-described Patent Document 2, the rotator cam gear 2007 and rotator lever 2010 are set between the loader cam gear 2005 and the threader drive gear (not illustrated in FIGS. 6 to 10; refer to FIG. 3). Therefore, it is necessary to widely set the interval between the loader cam gear 2005 and the threader drive gear by the value equivalent to the dimensions of the rotator cam 2007 and the rotator lever 2010. Moreover, because the rotator cam 2007 and rotator lever 2010 rotate in C-C' direction and D-D' direction, it is necessary to secure regions in which they rotate. Therefore, in the case of the configuration in the above Patent Document 2, it is difficult to downsize an apparatus.

SUMMARY OF THE INVENTION

In view of the foregoing and other exemplary problems, drawbacks, and disadvantages of the conventional techniques, it is an exemplary feature of the present invention to provide apparatus for threading a tape from a cartridge capable of further downsizing a cartridge magnetic tape drive.

The present invention provides an apparatus for threading a tape from a cartridge. In accordance with the present invention, the apparatus comprises a leader block rotating to capture a coupling element of the tape, a rod linearly moving to rotate the leader block, and a loader cam gear moving the rod.

According to the present invention, the rod linearly moves to rotate the leader block. Since the rod moves linearly rather than rotate, it is possible to further downsize the apparatus.

The apparatus may comprise a first cam provided with the loader cam gear. The first cam may move the rod so that the leader block can capture the coupling element when the loader cam gear rotates in the capture direction.

The apparatus may comprise an excessive-pressure absorbing portion absorbing the pressure when the first cam pushes the rod.

The apparatus may comprise a second cam provided with the loader cam gear. The second cam may move the rod so that the leader block can release the coupling element when the loader cam gear rotates in the direction opposite to the capture direction.

The apparatus may comprise a rod lever provided between the rod and the first cam and the rod lever may deform the excessive-pressure absorbing portion when the first cam pushes the rod lever excessively.

The apparatus may comprise a rod pushing element provided with the rod and the rod pushing element may establish a contact with the first cam. The excessive-pressure absorbing portion may be provided in the rod, push the rod pushing element in the direction towards the first cam, and deform when the rod pushing element is pushed by the first cam excessively in the opposite direction towards the first cam.

The rod may be linearly movable in the direction of an axis of the rod.

The apparatus may comprise a threader drive gear moving the leader block and the rod may be provided between the loader cam gear.

The present invention also provides the apparatus for threading a tape from a cartridge comprises first means for rotating to capture a coupling element of the tape and second means for moving linearly to rotate the first means, and third means for moving the second means.

The present invention also provides the apparatus for threading a tape from a cartridge comprises a leader block on which a hook portion is formed. The hook portion captures a leader pin of a magnetic tape. The apparatus comprises a rotator holding the leader block positioned to a capture position and rotating the leader block, a rotator lever rotating together with the rotator, a rod connected to the front end of the rotator lever to move the rotator lever, and a loader cam gear moving the rod. The rod can move in a linear direction.

According to the above configuration, when rotating a loader cam-gear, the loader cam gear drives a rod, thereby the rod rotation-drives a rotator lever. Then, a rotator rotates together with the rotator lever, and a hook portion of a leader block positioned to a capture position in the rotator captures a leader pin of a magnetic tape.

In the case of a configuration of the present invention, it is possible to decrease a space to be secured for an operation region compared to a configuration for rotation-driving a rotator lever by using a rotating rotator cam because a rod for rotation-driving the rotator lever can move in a linear direction. Moreover, in the case of a configuration of the present invention, because a rod can be constituted of an elongated member, it is possible to decrease a space used by the rod compared to a configuration for rotation-driving a rotator lever by using a rotator cam. Therefore, in the case of a configuration in which a rod is set between a loader cam gear and a threader drive gear for driving a leader block, it is possible to comparatively decrease the interval between the loader cam gear and the threader drive gear. Therefore, according to a configuration of the present invention, it is possible to further downsize a cartridge magnetic tape drive.

The apparatus may comprise a rod pressing portion movable for the rod. The rod pressing portion may be set to the rod. The apparatus may comprise a first cam contacting with the rod pressing portion when the loader cam gear rotates in the forward direction pressing the rod pressing portion to move the rod in the capture direction. The first cam may be set to the outer periphery of the loader cam gear. The apparatus may comprise an excessive-pressure absorbing portion being set to the rod. The excessive-pressure absorbing portion may elastically deform when the rod pressing portion is excessively pressed by the first cam.

According to the above configuration, even when the loader cam gear excessively rotates for any reason or movement of the rod is interrupted because a stack occurs when capturing the leader pin, the excessive-pressure absorbing portion is elastically deformed and thereby the loader cam gear can rotate in a certain range while holding the mechanism components such as the rod, rotator lever, rotator, and leader block in the present position. Because an excessive force working on the mechanism components is thus absorbed by the excessive-pressure absorbing portion being elastically deformed, it is possible to securely prevent the mechanism components from breaking. Moreover, it is possible to realize a design for excessively rotating the loader cam gear, delicate adjustment of the rotation value of the loader cam gear is unnecessary and moreover, it is possible to solve the problem that miscapture of the leader pin occurs due to excessive or insufficient rotation of the loader cam gear.

The apparatus may comprise a second cam being set to the outer periphery of the loader cam gear. The second cam may contact with the rod pressing portion when the loader cam gear rotates in the reverse direction and presses the rod pressing portion to move the rod in a release direction.

According to the above configuration, it is possible to forcibly move the rod in the release direction by rotating the loader cam gear in the reverse direction. Therefore, even when the urging force in the release direction by rod urging means due to a stack generated at the time of release is relative insufficient, it is possible to securely move the rod in the release direction and release the hook portion of the front end of the leader block from the leader pin of the magnetic tape.

The rod pressing portion may comprise a rod lever rotatably set to the rod and the excessive-pressure absorbing portion may comprise a rod lever spring to be elastically deformed when the rod lever is excessively pressed by the first cam and rotated.

Or the rod pressing portion may be set to the inside of the rod so as to be movable with respect to the rod and urged in the direction of front end of the rod by a rod reverse spring for urging the rod in a release direction and the excessive-pressure absorbing portion may comprise the rod reverse spring to be elastically deformed when the rod pressing portion is excessively pressed by the first cam and moved into the rod.

The rod may have a portion extending along a linear axis and the linear direction is the axis direction.

As described above, in the case of an apparatus for threading a tape from a cartridge of the present invention, a rod for rotation-driving a rotator lever is constituted so as to be movable in a linear direction. Therefore, it is possible to further downsize the cartridge magnetic tape drive.

The coupling element and the first cam could be embodied in the form of a leader pin 1b, and a capture cam 2b shown in the FIGS. 16A and 16B. The second cam could be embodied in the form of a release cam 2c shown in the FIG. 18A. The excessive-pressure absorbing portion could be embodied in the form of a rod lever spring 6 shown in the FIG. 16A or a rod reverse spring 24 shown in the FIG. 19A.

BRIEF DESCRIPTION OF THE DRAWINGS

The novel and exemplary features believed characteristic of the invention are set forth in the appended claims. The invention itself, however, as well as other exemplary features and advantages thereof, will be best understood by reference to the detailed description which follows, read in conjunction with the accompanying drawings, wherein:

FIG. 4A is an illustration showing the working principle of the conventional leader block rotating mechanism disclosed in Patent Document 1;

FIG. 4B is an illustration showing the working principle of the conventional leader block rotating mechanism disclosed in Patent Document 1;

FIG. 4C is an illustration showing the working principle of the conventional leader block rotating mechanism disclosed in Patent Document 1;

FIG. 5A is an illustration showing a schematic configuration of the conventional cartridge magnetic tape drive disclosed in Patent Document 1;

FIG. 5B is an illustration showing a schematic configuration of the conventional cartridge magnetic tape drive disclosed in Patent Document 1;

FIG. 18A is an illustration showing a series of operations when a leader block of an exemplary embodiment captures a leader pin;

FIG. 18B is an illustration showing the enlarged view of X3 portion in FIG. 18A;

DETAILED DESCRIPTION OF THE PREFERRED EMBODIMENTS

Then, exemplary embodiments of the present invention are described below by referring to the accompanying drawings.

Figure 1:
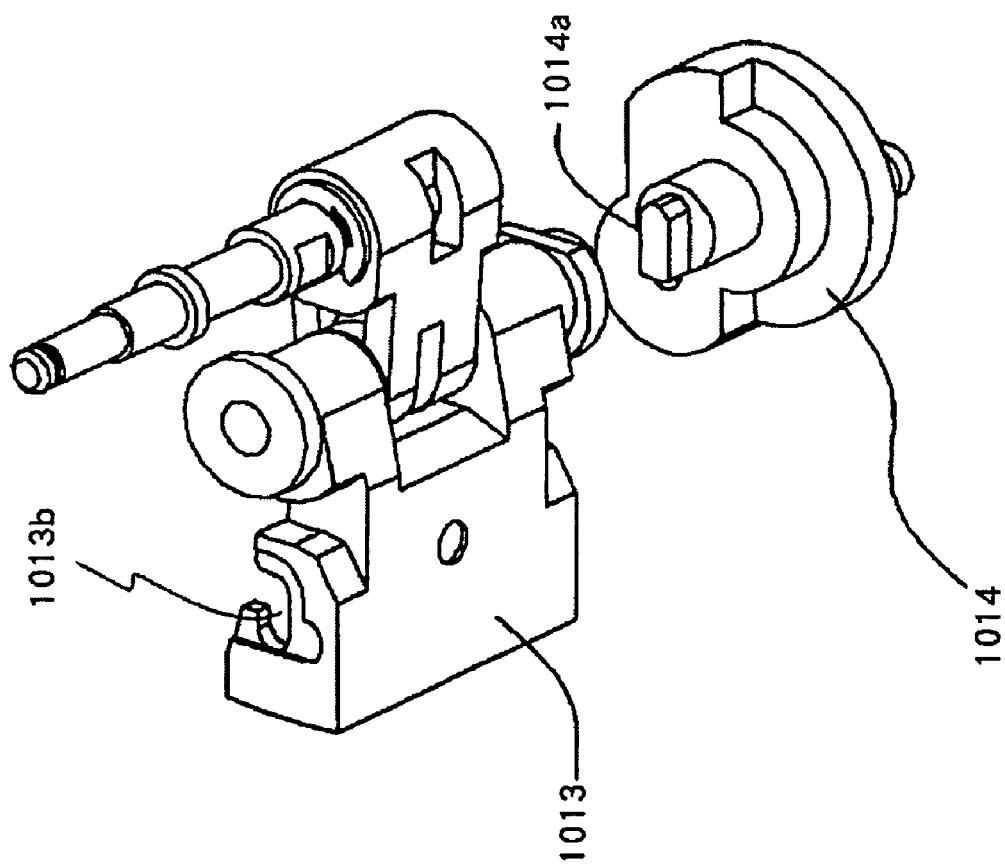
FIG. 1 is an illustration showing the outline of a configuration of the conventional leader block rotating mechanism disclosed in Patent Document 1.
Figure 2:
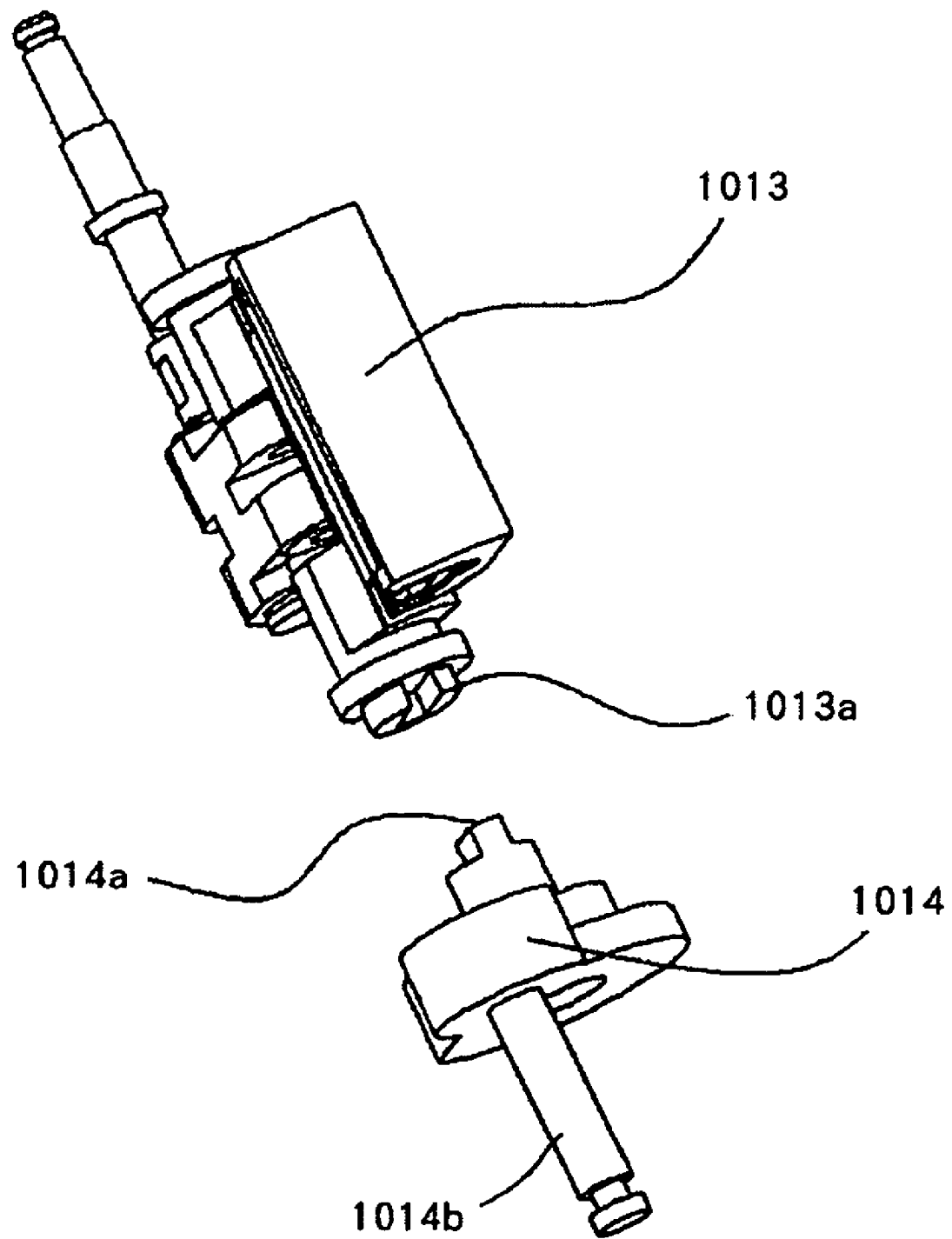
FIG. 2 is an illustration showing the outline of a configuration of the conventional leader block rotating mechanism disclosed in Patent Document 1.
Figure 3A:
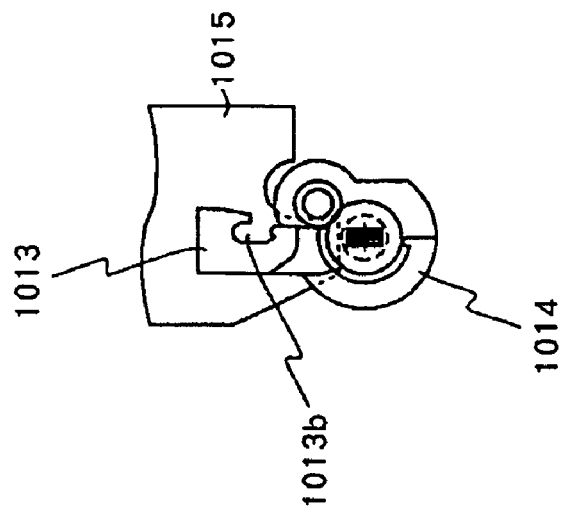
FIG. 3A is an illustration showing the working principle of the conventional leader block rotating mechanism disclosed in Patent Document 1.
Figure 3B:
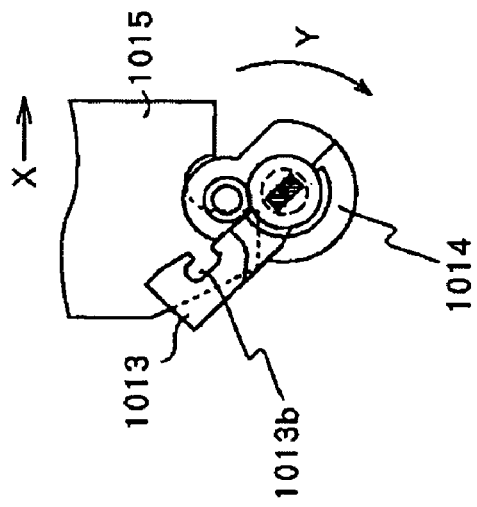
FIG. 3B is an illustration showing the working principle of the conventional leader block rotating mechanism disclosed in Patent Document 1.
Figure 3C:
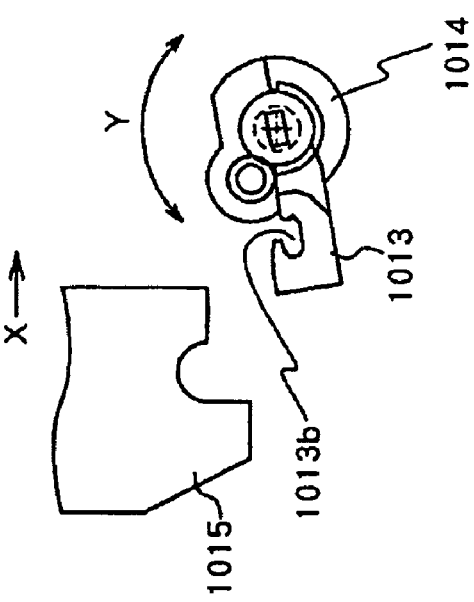
FIG. 3C is an illustration showing the working principle of the conventional leader block rotating mechanism disclosed in Patent Document 1.
Figure 6:
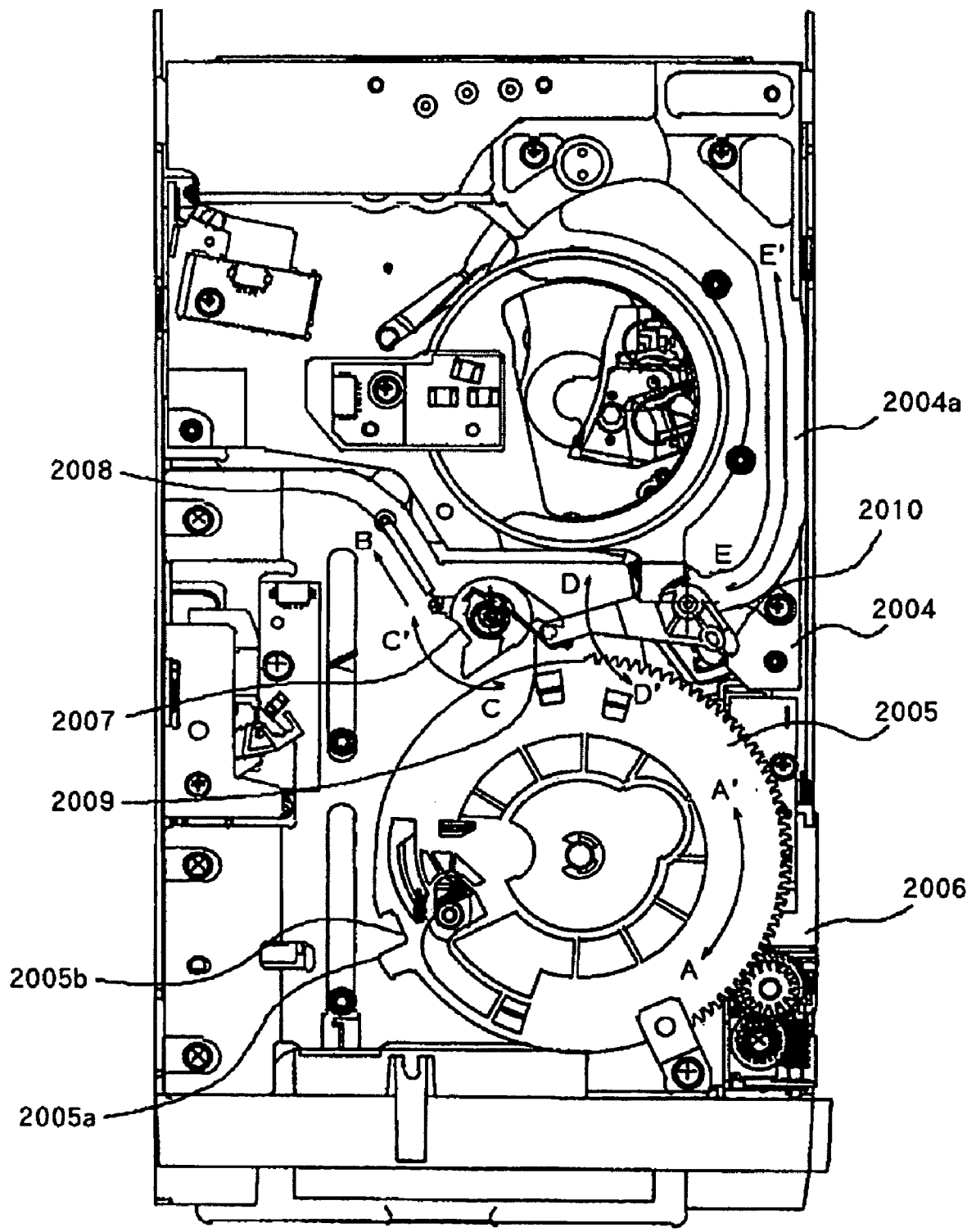
FIG. 6 is an illustration for explaining a leader block rotating mechanism of the cartridge magnetic tape drive disclosed in Patent Document 2.
Figure 7:
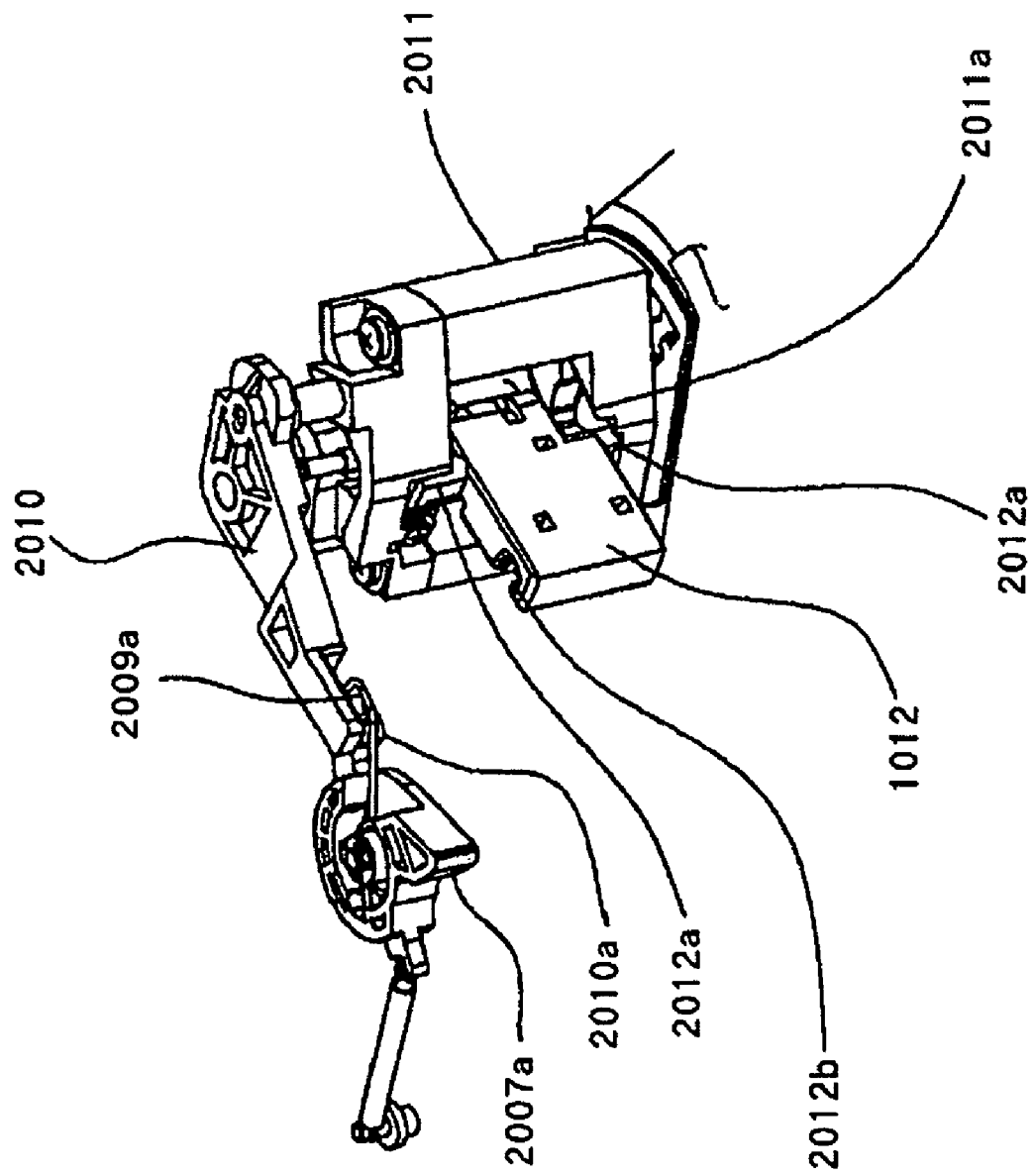
FIG. 7 is an illustration for explaining a leader block rotating mechanism of the cartridge magnetic tape drive disclosed in Patent Document 2.
Figure 8:
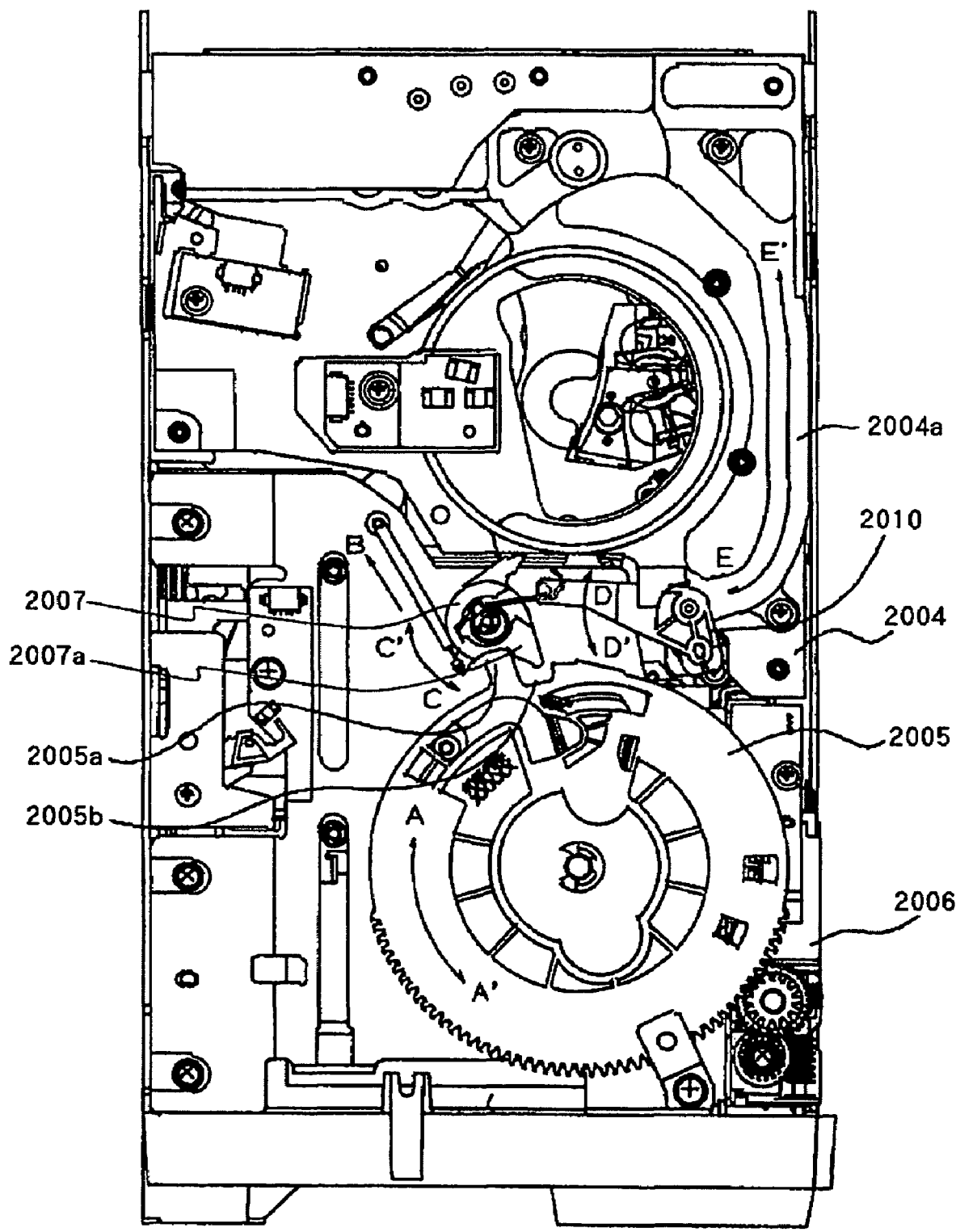
FIG. 8 is an illustration for explaining a leader block rotating mechanism of the cartridge magnetic tape drive disclosed in Patent Document 2.
Figure 9:
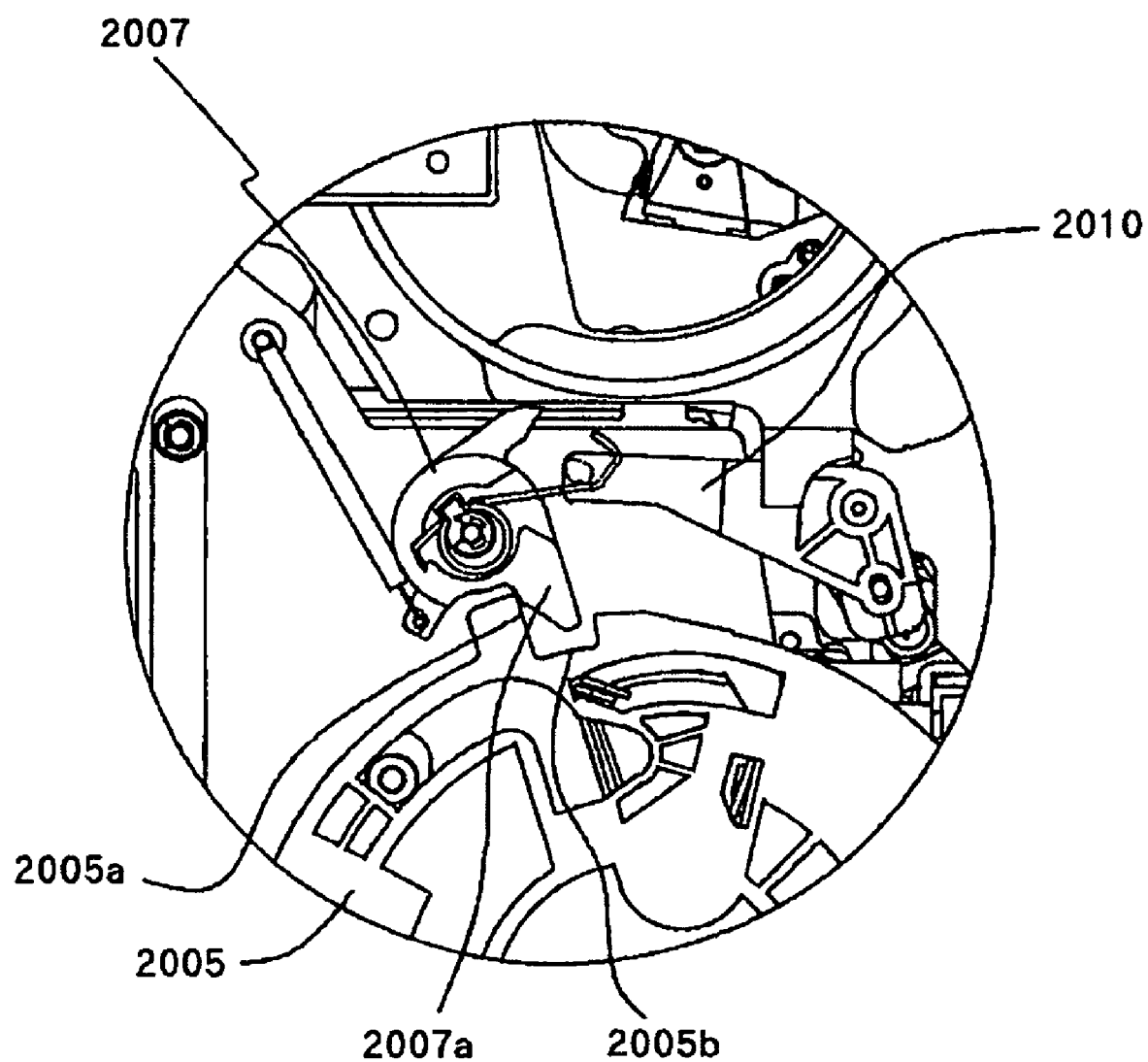
FIG. 9 is an illustration for explaining a leader block rotating mechanism of the cartridge magnetic tape drive disclosed in Patent Document 2.
Figure 10:
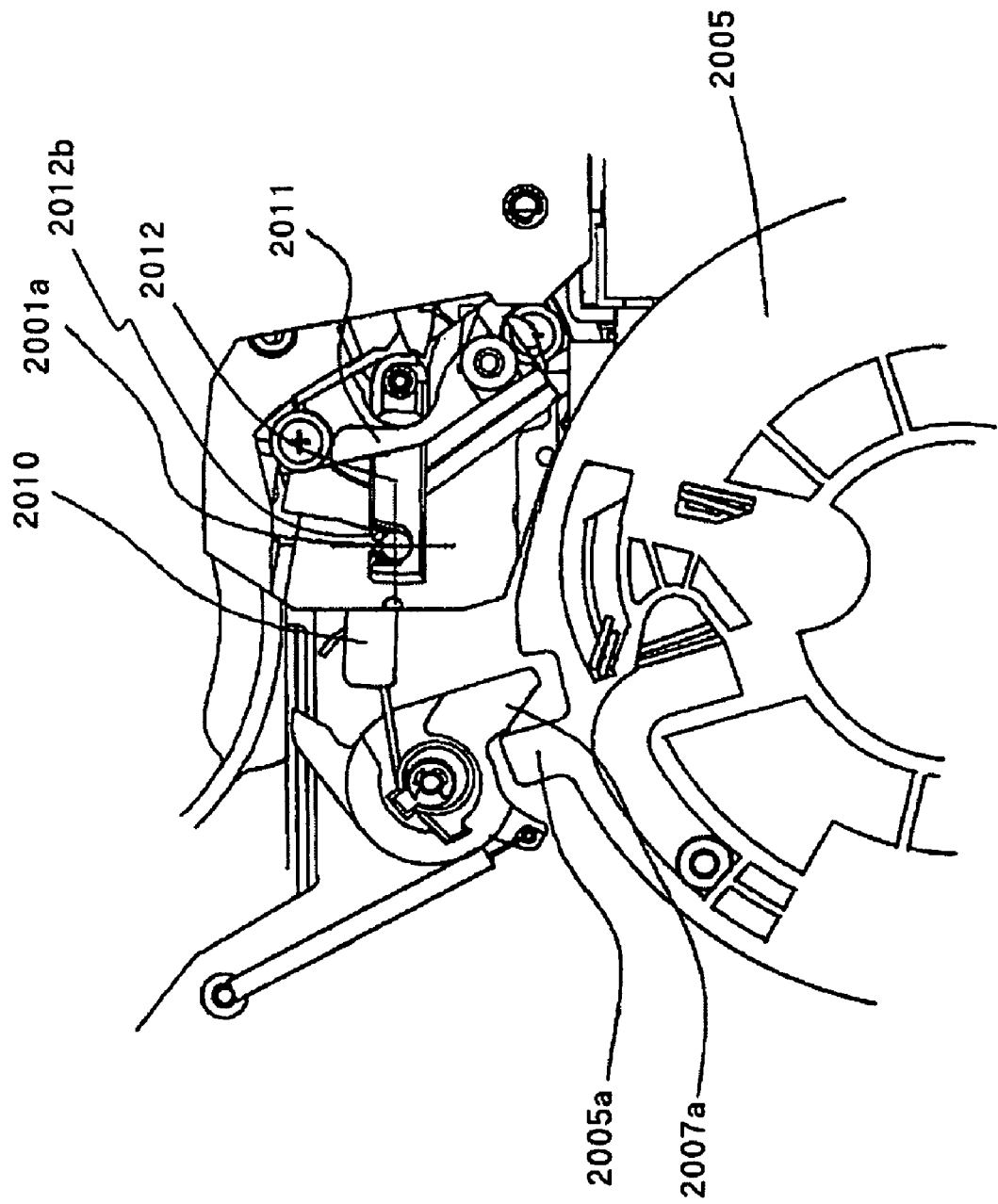
FIG. 10 is an illustration for explaining a leader block rotating mechanism of the cartridge magnetic tape drive disclosed in Patent Document 2.
Figure 11A:
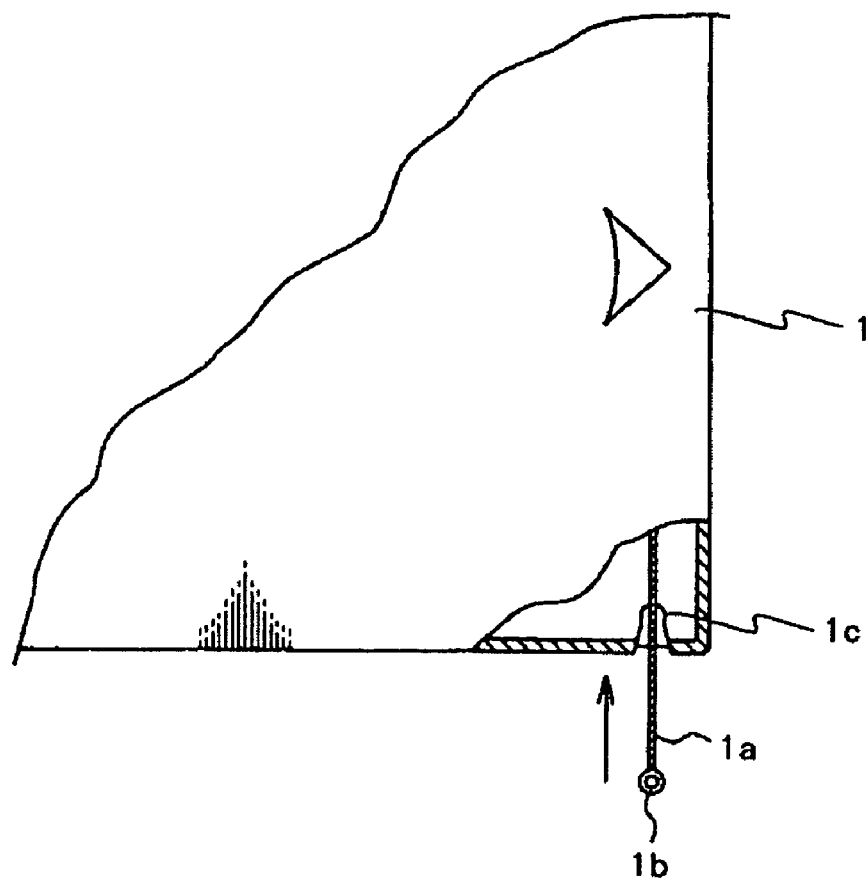
FIG. 11A is an illustration showing a major portion of a magnetic tape cartridge used for the cartridge magnetic tape drive of an exemplary embodiment.
Figure 11B:
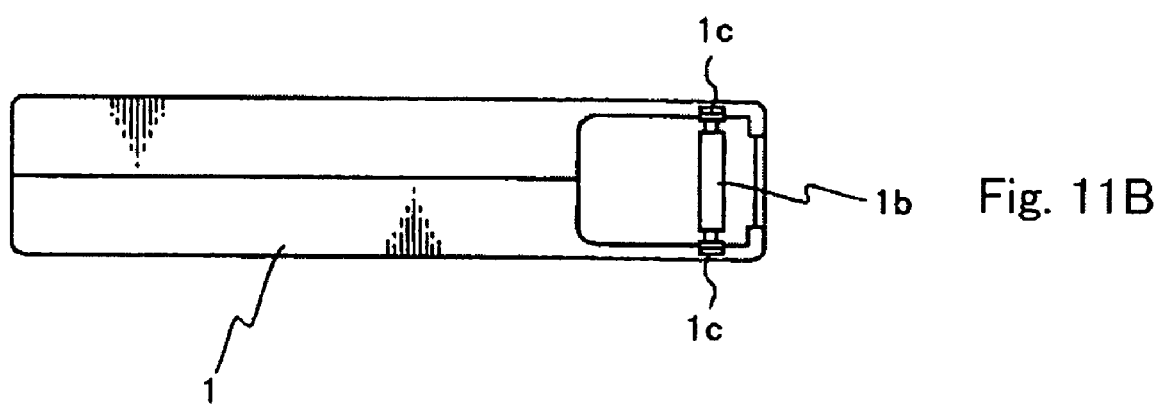
FIG. 11B is an illustration showing a major portion of a magnetic tape cartridge used for the cartridge magnetic tape drive of an exemplary embodiment.

FIGS. 11A and 11B are illustrations showing a major portion of a configuration of a magnetic tape cartridge used for a cartridge magnetic tape drive. FIG. 11A is a local sectional view of the major portion from the side of the cartridge and FIG. 11B is an illustration showing the major portion from a face on which there is a takeout port of a cartridge magnetic tape.

A cartridge 1 includes a magnetic tape 1a and a leader pin 1b is set to the front end of the magnetic tape 1a. The leader pin 1b is engaged with pin fixing grooves 1c formed at the both sides of the inner wall of the cartridge 1 toward the illustrated arrow direction.

Figure 12:
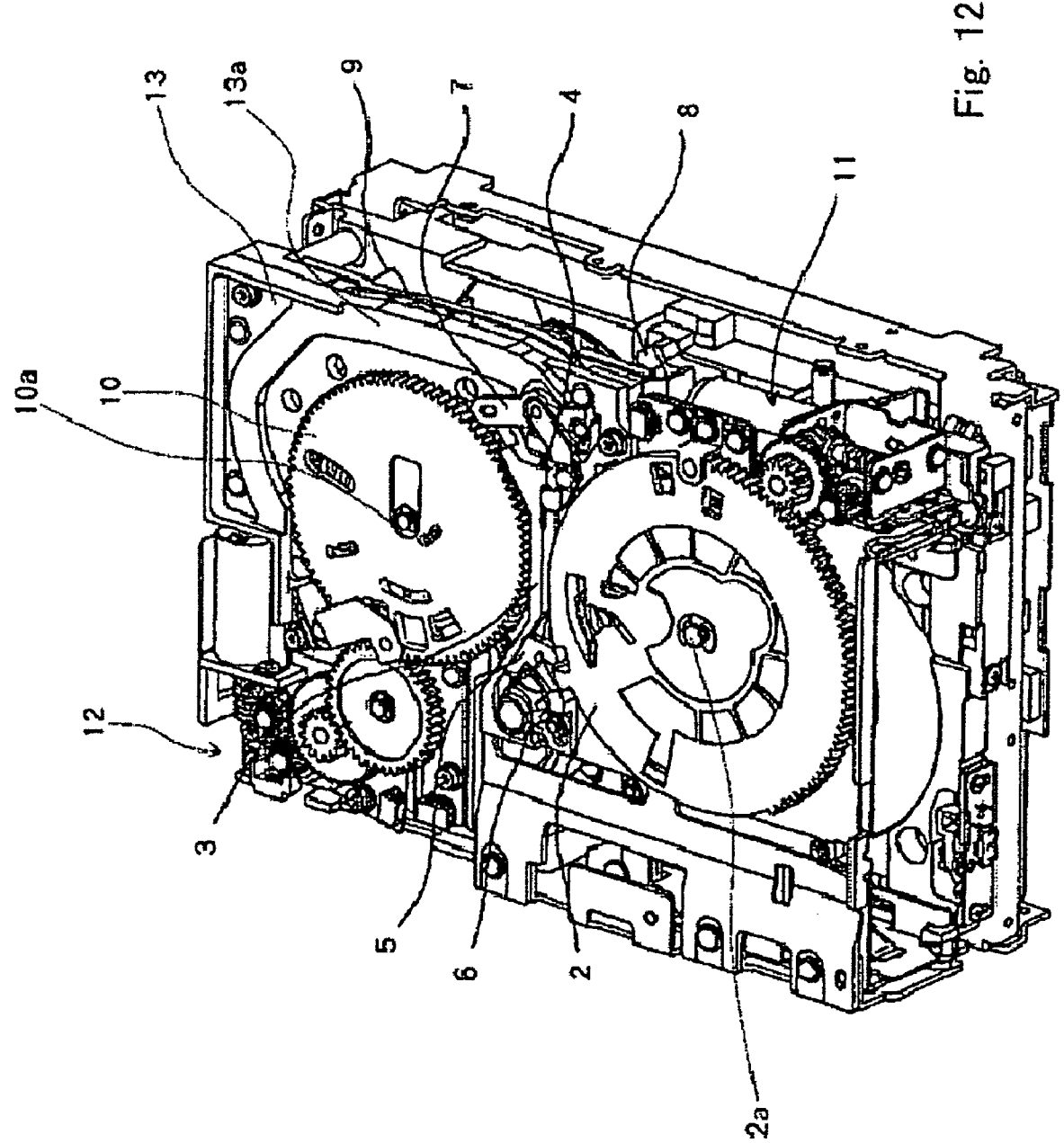
FIG. 12 is a perspective view showing the cartridge magnetic tape drive of an exemplary embodiment by removing the casing portion from the drive.
Figure 13:
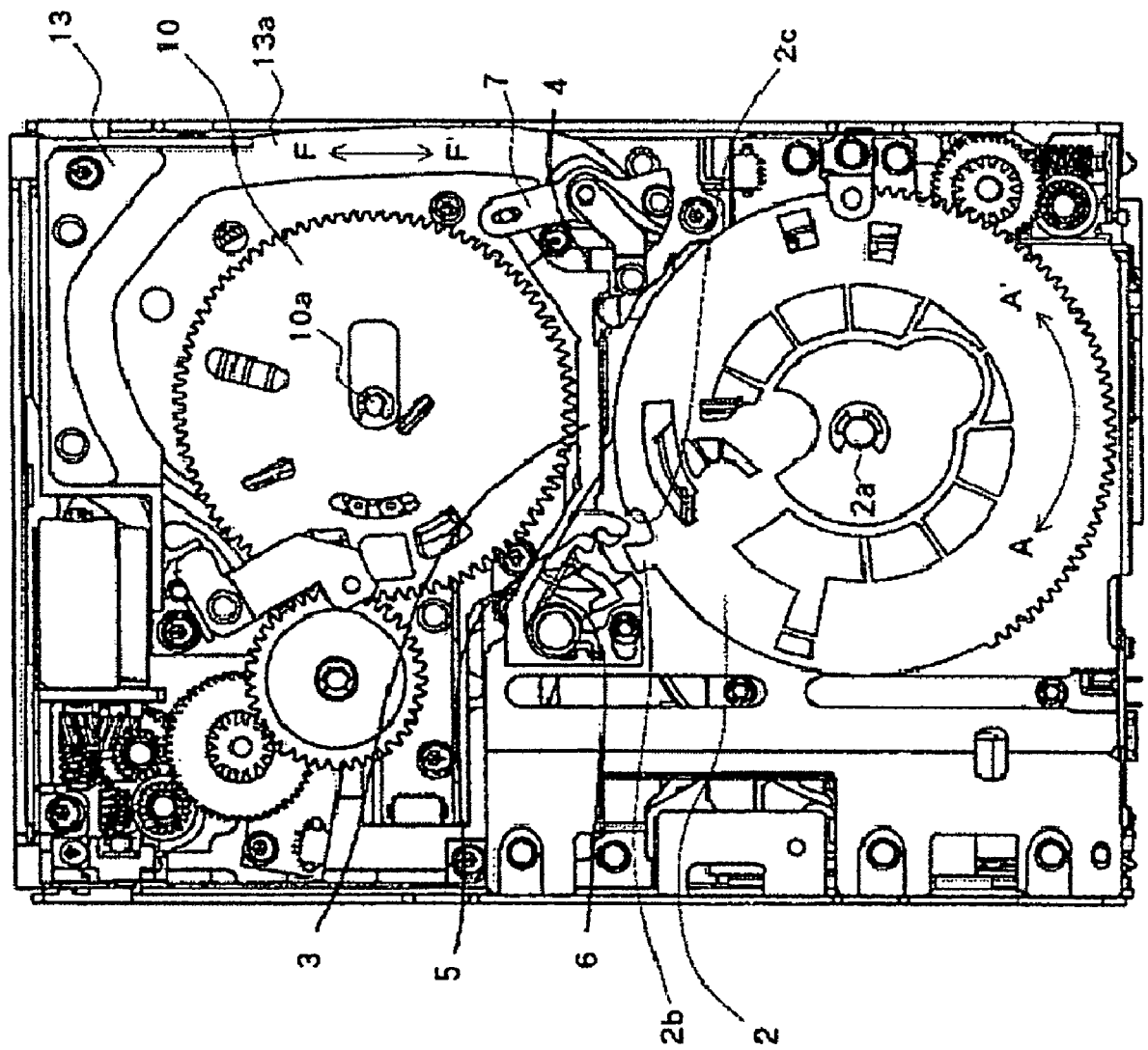
FIG. 13 is a top view of the cartridge magnetic tape drive of the exemplary embodiment shown in FIG. 12.
Figure 14:
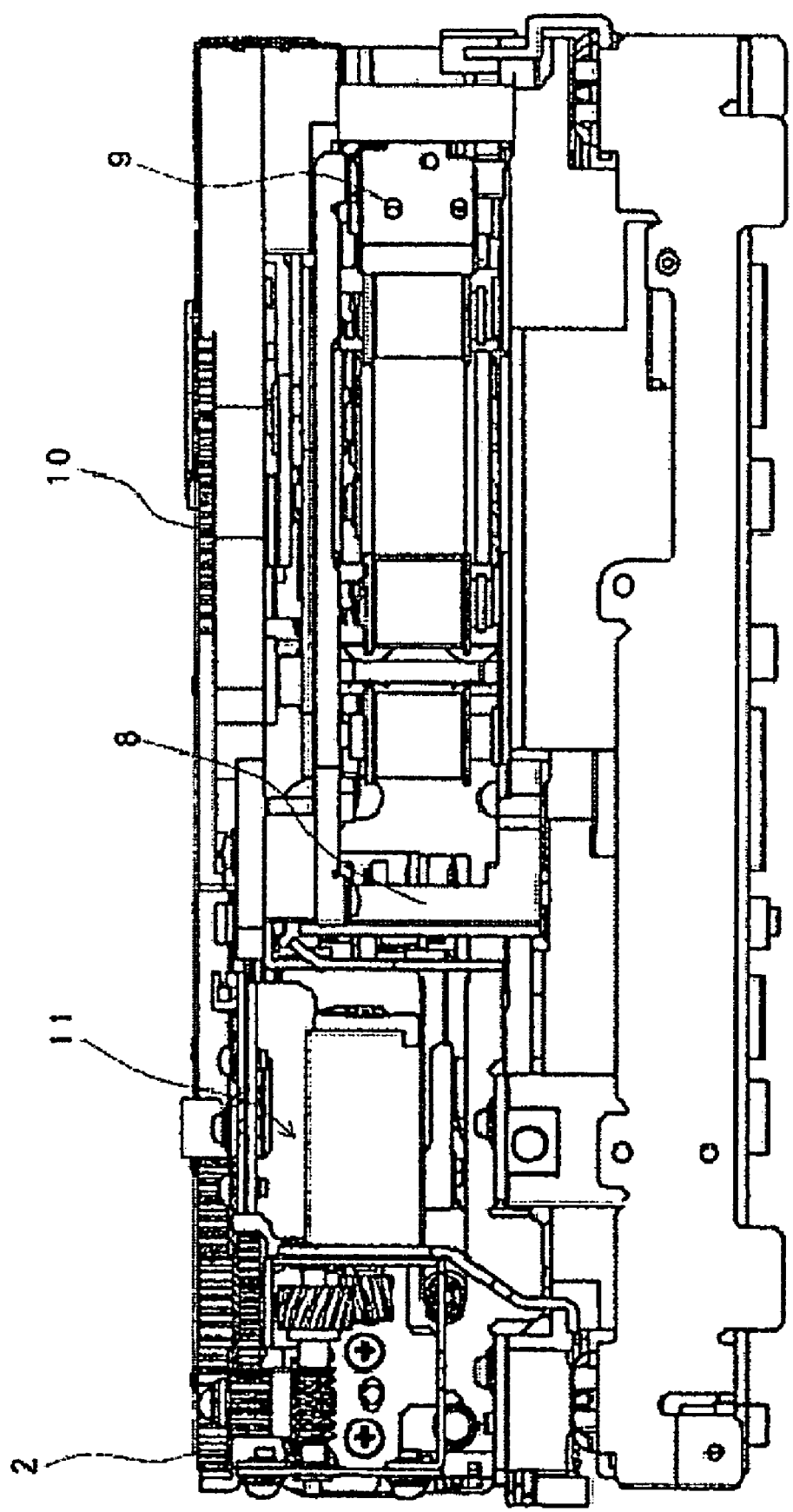
FIG. 14 is a right side view of the cartridge magnetic tape drive of the exemplary embodiment shown in FIG. 13.

FIG. 12 is a perspective view of a cartridge magnetic tape drive of the exemplary embodiment by removing a casing portion from the drive. FIG. 13 is a top view of the cartridge magnetic tape drive of the exemplary embodiment shown in FIG. 12. FIG. 14 is a right side view of the cartridge magnetic tape drive of the exemplary embodiment shown in FIG. 13.

The cartridge magnetic tape drive of this exemplary embodiment has a loader cam gear 2 rotatable about a rotational shaft 2a and a threader drive gear 10 rotatable about a rotational shaft 10a on its upside. A leader block rotating mechanism having a rod 3, rod lever 5, rotator lever 7, and rotator 8 is set in the region between the loader cam gear 2 and the threader drive gear 10. The rod 3 is linearly movable in the direction of an axis of the rod 3. The leader block rotating mechanism is more minutely described by referring to FIG. 15.

The loader cam gear 2 and threader drive gear 10 are constituted so as to be rotation-driven by first and second driving sources 11 and 12 respectively constituted of a motor and a driving gear string. A leader block 9 moves in the F-F' direction in FIG. 13 along a guide groove 13a of a cam plate 13 when the threader drive gear 10 is rotation-driven by the second driving source 12.

FIG. 13 is a top view of the cartridge magnetic tape drive of the exemplary embodiment shown in FIG. 12. A capture cam 2b is provided with the loader cam gear 2. The capture cam 2b moves rod 3 so that leader block 9 can capture the pin 1b of the tape 1a when said loader cam gear 2 rotates in the capture direction. In other words, capture cam 2b serving as a first cam contacting with the rod lever 5 when the gear 2 is rotated by the first driving source 11 in the illustrated A direction and a release cam 2c serving as a second cam contacting with the rod lever 5 when thereafter rotated in the illustrated A' direction.

Figure 15:
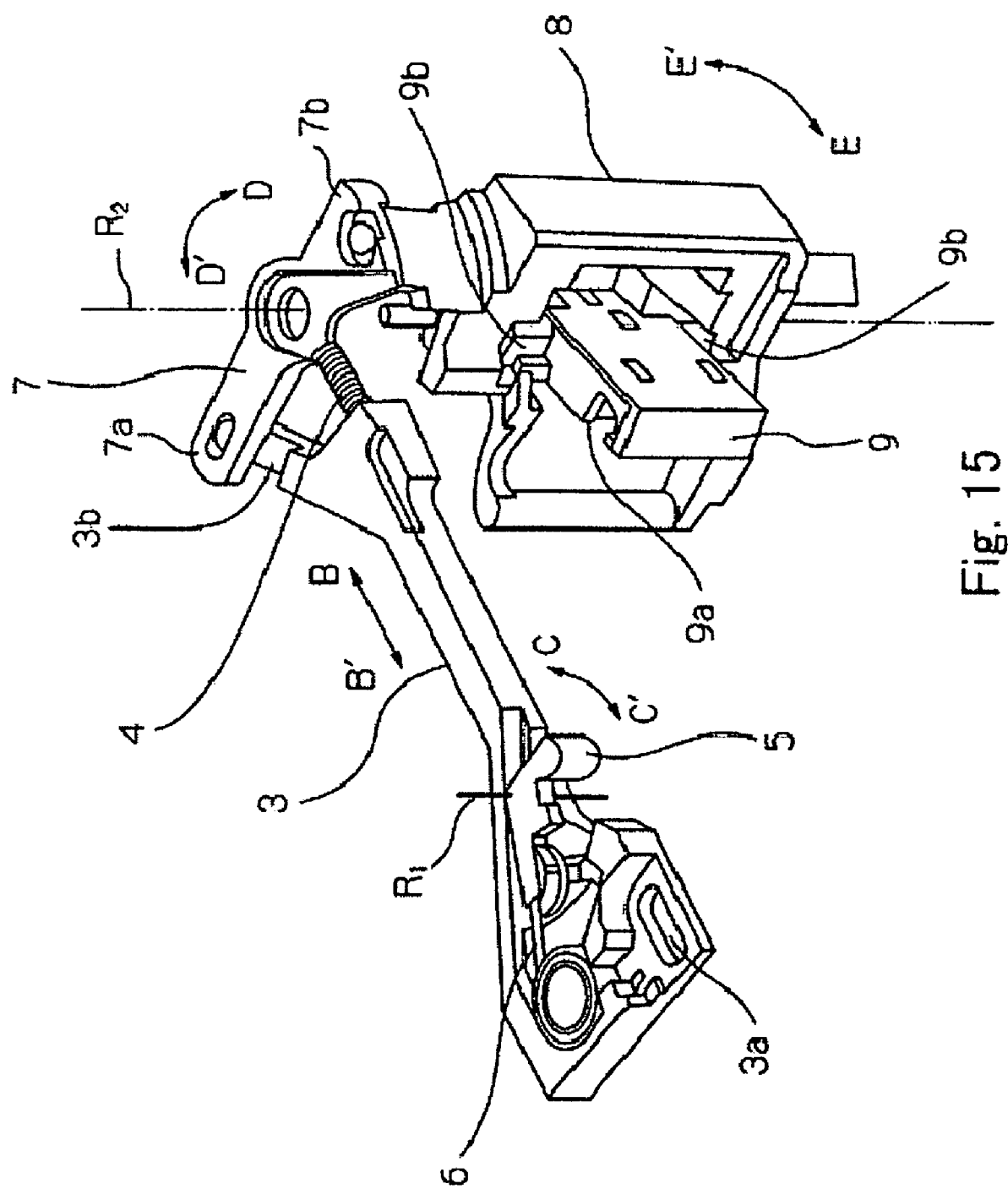
FIG. 15 is a perspective view specifically showing a mutual connective relation between components by extracting a leader block rotating mechanism from the drive of the exemplary embodiment in FIG. 12, etc.

FIG. 15 is a perspective view specifically showing a mutual connective relation between components by extracting the leader block rotating mechanism of the drive of the exemplary embodiment shown in FIG. 12, etc. FIG. 15 shows a state in which the leader block 9 is set to the capture position in the rotator 8. Namely, the leader block 9 rotates to capture the pin 1b of the tape 1a (the pin 1b and the tape 1a is not shown in the FIG. 15). The rod 3 linearly moves to rotate the leader block 9 and the loader cam gear 2 (not shown in FIG. 15) moves the rod 3.

A long hole 3a to be movably set to the drive side by a pin is formed at one end of the rod 3. The rod 3 is supported by the long hole 3a so as to be movable in the axis direction of the rod 3 which is the linear direction along the illustrated B-B' line. Moreover, the rod lever 5 serving as rod pressing means is set to the end at which the long hole 3a of the rod 3 is formed about a rotational shaft R1 rotatably in the illustrated C-C' direction. The rod lever 5 is urged by a rod reverse spring 6 serving as excessive pressure absorbing means which is similarly set to one end at which the long hole 3a of the rod 3 is formed in the illustrated C' direction. The excessive-pressure absorbing means absorbs the pressure when the capture cam 2b pushes the rod 3.

Moreover, a rod reverse spring 4 is set to the other end of the rod 3. A part of the rod reverse spring 4 is inserted into the rod 3 and the spring 4 generates a repulsive force for pushing back the rod 3 in the illustrated B' direction (release direction) because it is contracted when the rod 3 moves in the illustrated B direction (capture direction). A rod arm 3b extends from the other end of the rod 3 and the front end of the arm 3b links to one end 7a of the rotator lever 7. Thereby, the rotator lever 7 rotates in the illustrated D-D' direction about a rotational shaft R2 when the rod 3 moves in the illustrated B-B' direction. A rotator 8 set to the other end 7b of the rotator level 7 also rotates in the illustrated E-E' direction about the rotational shaft R2 in accordance with the rotation of the rotator lever 7.

The leader block 9 is engaged with a guide groove (not illustrated) in which a protrusion 9b of the leader block 9 is formed in the rotator 8 and thereby positioned to the capture position in the rotator 8. When the rotator 8 rotates as described above, the leader block 9 also rotates together with the rotator 8. That is, as shown in FIG. 15, while the leader block 12 is positioned to the capture position in the rotator 8 and held by the rotator 8, the rotator lever 7, rotator 8, and leader block 9 rotate together. The rotation causes the leader block 9 to operate so as to capture the leader pin 1b of the cartridge 1 (refer to FIG. 11) by a hook 9a.

After capturing the leader pin 1b by the hook 9a of the leader block 9, by rotation-driving the threader drive gear 10 and moving the leader block 9 along the guide groove 13a of the cam plate 13 in the F direction in FIG. 13, it is possible to extract the magnetic tape 1a from the cartridge 1. This operation is the so-called threading.

Figure 16B:
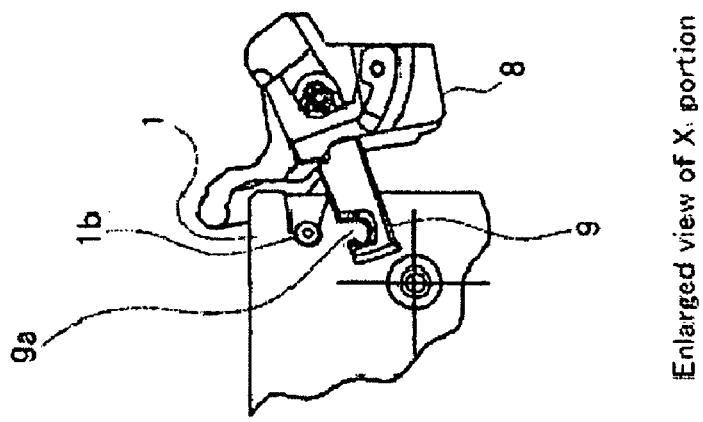
FIG. 16B is an illustration showing the enlarged view of X1 portion in FIG. 16A.
Figure 16A:
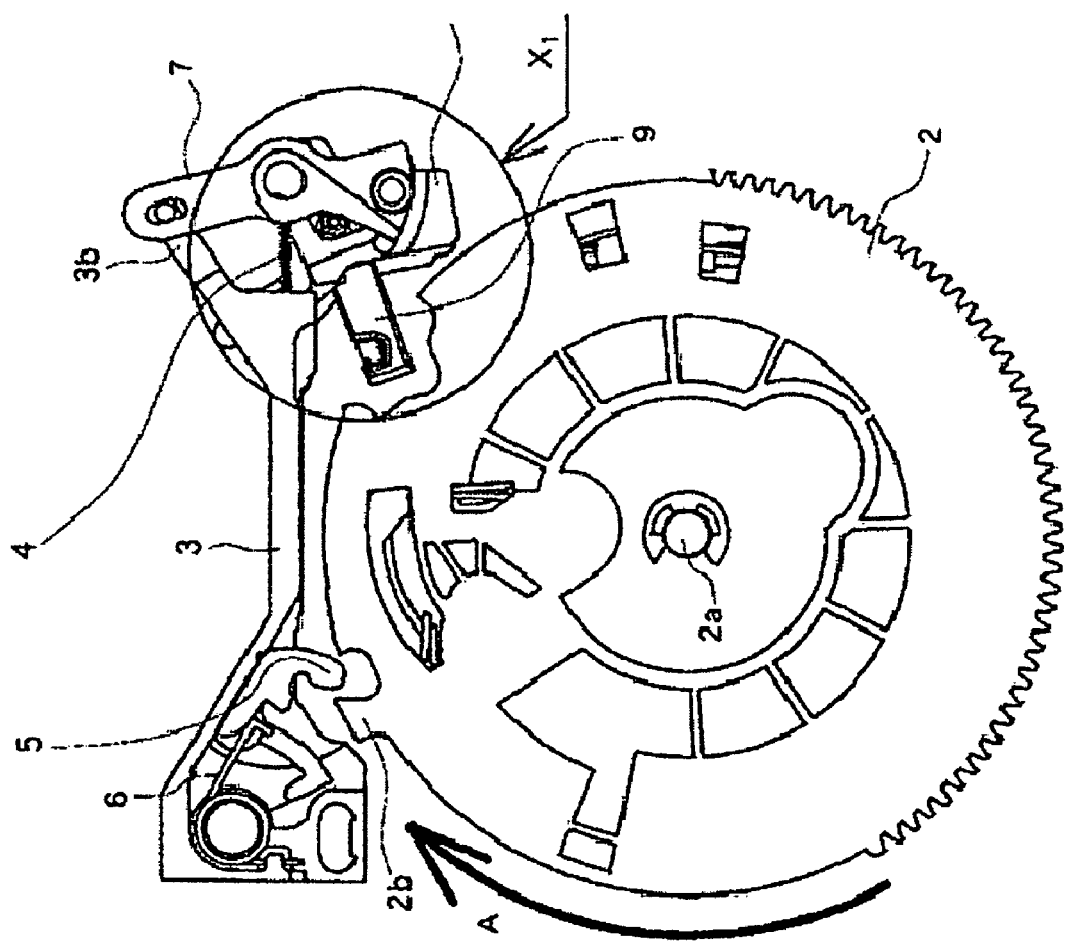
FIG. 16A is an illustration showing a series of operations when a leader block of an exemplary embodiment captures a leader pin.
Figure 17B:
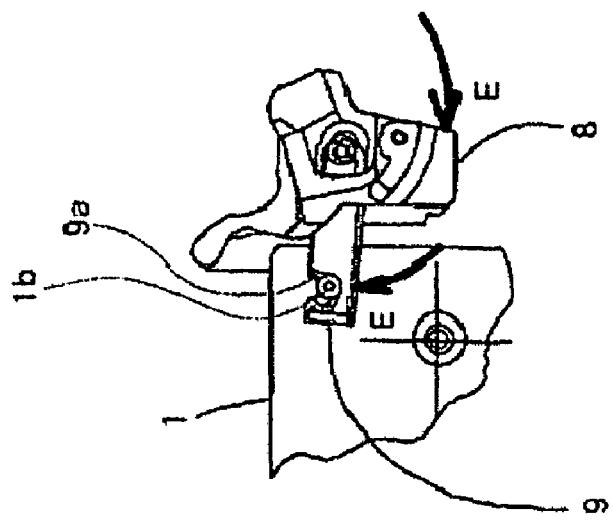
FIG. 17B is an illustration showing the enlarged view of X2 portion in FIG. 17A.
Figure 17A:
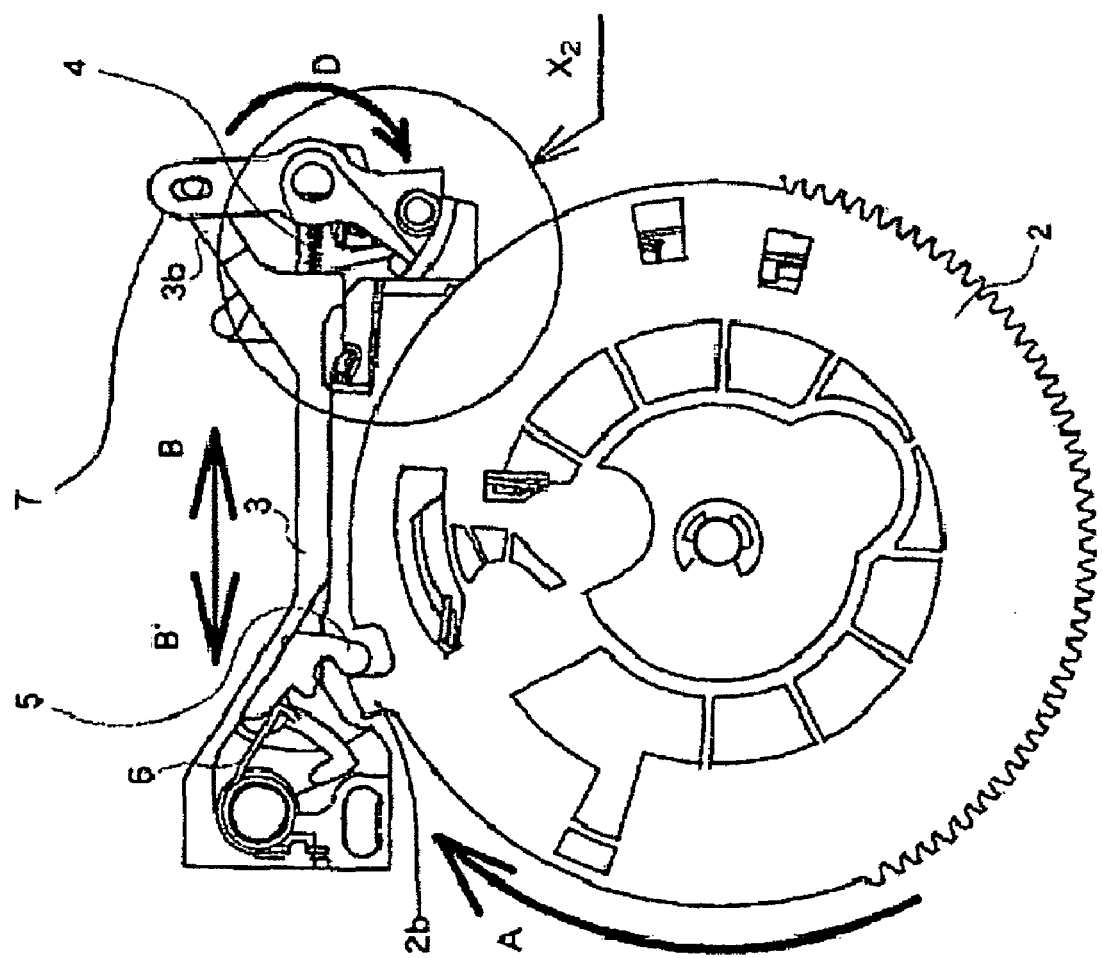
FIG. 17A is an illustration showing a series of operations when a leader block of an exemplary embodiment captures a leader pin.

Then, a series of operations when the leader block 9 captures the leader pin 1b is described below by referring to FIGS. 12 and 13 and FIGS. 16 to 18. FIG. 16A is an illustration showing a series of operations when a leader block of an exemplary embodiment captures a leader pin. FIG. 16B is an illustration showing the enlarged view of X1 portion in FIG. 16A. FIG. 17A is an illustration showing a series of operations when a leader block of an exemplary embodiment captures a leader pin. FIG. 17B is an illustration showing the enlarged view of X2 portion in FIG. 17A. FIG. 18A is an illustration showing a series of operations when a leader block of an exemplary embodiment captures a leader pin. FIG. 18B is an illustration showing the enlarged view of X3 portion in FIG. 18A When the cartridge 1 is inserted into the cartridge magnetic tape drive, the first driving source 11 is driven and the loader cam gear 2 is rotated in the forward direction, that is, A direction in FIG. 13. When the loader cam gear 2 is rotated in the forward direction, the cartridge 1 is positioned to a proper position, that is, a position at which the leader block 9 can capture the leader pin 1b by a known means disclosed in Patent Document 1, etc. and the cartridge 1 is loaded.

When loading of the cartridge 1 is completed, the second driving source 12 is driven, the threader drive gear 10 is rotated, and the leader block 9 moved in the F' direction in FIG. 13 along the guide groove 13a of the cam plate 13. As shown in FIG. 15, the leader block 9 stops because the protrusion 9b of the leader block 9 is engaged with a guide groove (not illustrated) of the rotator 8, and is positioned to the capture position in the rotator 8. The cartridge magnetic tape drive becomes the state shown in FIGS. 16A and 16B in accordance with the above operation. In the state shown in FIGS. 16A and 16B, the capture cam 2b of the loader cam gear 2 does not contact with the rod lever 5 yet or the hook 9a of the leader block 9 does not capture the leader pin 1b.

Thereafter, when the loader cam gear 2 further rotates in the forward direction (A direction), the capture cam 2b of the loader cam gear 2 contacts with the rod lever 5 as shown in FIGS. 17A and 17B. When the loader cam gear 2 further rotates in the forward direction from the above state, the rod 3 moves in the B direction (capture direction) and the rod arm 3b rotates the rotator lever 7 in the D direction. In this case, the rod reverse spring 4 is pushed and contracted in accordance with the movement of the rod 3 and a repulsive force for pushing back the rod 3 in the B' direction is generated. However, the repulsive force is small compared with the rotation driving force of the loader cam gear 2, it does not influence the movement operation of the rod 3.

When the rotator lever 7 rotates in the D direction, the rotator 8 and leader block 9 thereby rotate in the E direction and the hook 9a of the leader block 9 captures the leader pin 1b.

When referring to FIGS. 18A and 18B in this case, the rod lever spring 6 functioning as excessive pressure absorbing means is elastically deformed in the C direction by the other end of the rod lever 5 and bent when a certain force or more works on the rod lever 5 in the A direction. Namely, the rod lever 5 is provided between the rod 3 and the capture cam 2b. The rod lever 5 deforms the excessive-pressure absorbing means when the capture cam 2b pushes the rod lever 5 excessively. Then, it is possible to rotate only the rod lever 5 while keeping attitudes of mechanism components of the rod 3, rotator lever 7, rotator 8, and leader block 9 at the present positions. Therefore, when the loader cam gear 2 is about to excessively rotates in the A direction or rotation of the rotator lever 7 is interrupted because a stack occurs when capturing the leader pin 1a, even if an excessive force is applied to the rod lever 5, it is possible to prevent a problem that the capture cam 2b of the loader cam gear 2 or the above mechanism components are damaged or an over load is generated in the driving source 11.

Thus, in the case of this exemplary embodiment, a slight difference of a load applied to the rod lever 5 does not become a substantial problem. Therefore, a delicate adjustment of the rotation stop position of the loader cam gear 2 or the like at the time of-capture is completely unnecessary. Moreover, by designing the rod lever 5 so that a slight overload occurs, for example, by rotating the loader cam gear 2 in the forward direction so that it slightly over-travels, it is possible to securely prevent a problem that miscapture of the leader pin 1b occurs due to excessive or insufficient movement of the rod 3.

Thus, after the leader pin 1b is captured by the hook 9a of the leader block 9, the threader drive gear 10 is rotation-driven, the leader block 9 is moved in the F direction in FIG. 13 along the guide groove 13a of the camp plate 13, and the magnetic tape 1a is extracted from the cartridge 1 (threading operation).

Then, a series of operations when releasing the leader pin 1b are described. The operations at the time of release are basically realized by back-tracing the above-described operations at the time of capture.

Specifically, first the leader block 9 holding the leader pin 1b by the hook 9a moves in the F' direction in FIG. 13 along the guide groove 13a of the camp plate 13. As shown in FIG. 15, the leader block 9 stops at the position at which the protrusion 9b of the leader block 9 is engaged with a guide groove (not illustrated) of the rotator 8 and is positioned to the capture position in the rotator 8. At this stage, the leader pin 1b is returned into the pin fixing groove 1c in the cartridge 1.

Thereafter, when the loader cam gear 2 is rotated in the opposite direction, that is, in the A' direction in FIG. 18A and 18B, the capture cam 2b pressing the rod 3 in the B direction separates from the rod lever 5 by pressing the rod lever 5. Then, the rod lever 5 is urged in the C' direction by the rod lever spring 6. When the capture cam 2b separates from the rod lever 5, the rod 3 is returned in the B' direction (release direction) by the rod reverse spring 8. Then, the rotator lever 7 is pulled by the rod arm 3b to rotate in the D' direction. Thus, the rotator 8 and leader block 9 rotate in the E' direction and the hook 9a of the leader block 9 is removed from the leader pin 1b.

In this case, even if rotation of the rotator 8 or rotator lever 7 is interrupted because the leader pin 1b bites on the hook 9a of the leader block 9 and the moving operation of the rod 3 in the B' direction is stacked, it is possible to forcibly move the rod 3 in the B' direction. When the loader cam gear 2 rotates in the A' direction, the release cam 2c of the loader cam gear 2 contacts with the rod lever 5 to press the rod 3 so as to move it in the B' direction.

The release cam 2c of the loader cam gear 2 contacts with the rod lever 5 only when the rod 3 is stacked while it is moved in the B direction (capture direction). The rod lever 5 enters the groove between the capture cam 2b and the release cam 2c of the loader cam gear 2. When rotating the loader cam gear 2 in the A' direction, the release cam 2c contacts with the rod lever 5. When forcibly moving the rod 3 in the B' direction by pressing the rod lever 5 by the release cam 2c of the loader cam gear 2, it is possible to rotate the leader block 9 in the E' direction through the rotator lever 7 and the rotator 8 and release the hook portion 9a of the leader block 9 from the leader pin 1b set in the pin fixing groove 1c. Namely, the release cam 2c is provided with the loader cam gear 2, the release cam 2 moves the rod 3 so that the leader block 9 can release the pin 1b when the loader cam gear 2 rotates in the direction opposite to the capture direction.

Thereafter, the leader block 9 is moved in the F direction in FIG. 13 along the guide groove 13a of the came plate 13 by temporarily stopping operations of the loader cam gear 2 and rotation-driving the threader drive gear 10. Thereby, the leader block 9 is taken out of the rotator 8. By rotating the loader cam gear 2 in the A' direction, the cartridge 1 moves to a cartridge input port. Thereby, unloading of the cartridge 1 is completed.

According to the configuration of the above-described exemplary embodiment, the rod 3 for rotating the rotator lever 7 works only in its axis direction and moreover, it is not provided with a rotator cam serving as a rotational member in the configuration of the previous application. Therefore, it is possible to decrease a space to be secured for the operation region compared to the case of the configuration of the previous application. Moreover, because the rod 3 is constituted of an elongated member, the space occupied by the rod 3 is small compared to the configuration for rotation-driving a rotator lever by using a rotator cam. Therefore, in the case of a configuration in which the rod 3 is set between the loader cam gear 2 and the threader drive gear 10, it is possible to comparatively decrease the interval between the loader cam gear 2 and the threader drive gear 10. Therefore, it is possible to further downsize a cartridge magnetic tape drive.

The configuration in which the rod 3 has a portion extending along the linear axis along the illustrated line B-B' is described as an example in which the axis direction of the rod 3 is a linear direction which is the moving direction of the rod 3. However, when the rod 3 is constituted like an arch or down-turn shape, it does not have a portion extending along a linear axis. However, even in this case, by moving the rod 3 in a linear direction, it is possible to convert the rotational motion of the loader cam gear 2 into a linear motion and moreover, convert the linear motion into the rotational motion of the rotator lever 7.

Moreover, when there is a play between the long hole 3a of the rod 3 and a pin (not illustrated) supporting the rod 3 and the cams 2b and 2c of the loader cam gear 2 contact with the rod lever 5, the rod 3 may move by slightly deviating from the linear direction of the rod 3 which is the moving direction of it. However, it is allowed that the "linear direction" described above includes such the slight deviation.

[Modification]

Then, a modification of the leader block rotating mechanism of the above-described exemplary embodiment is described below.

Figure 19B:
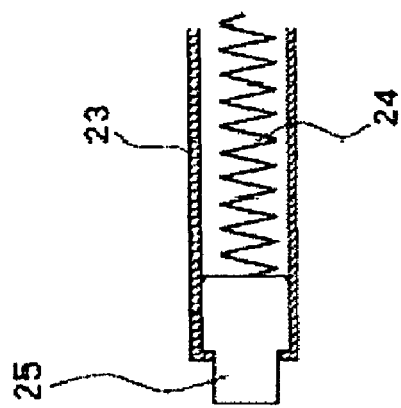
FIG. 19B is an illustration showing the enlarged view of the portion in FIG. 19A.
Figure 19A:
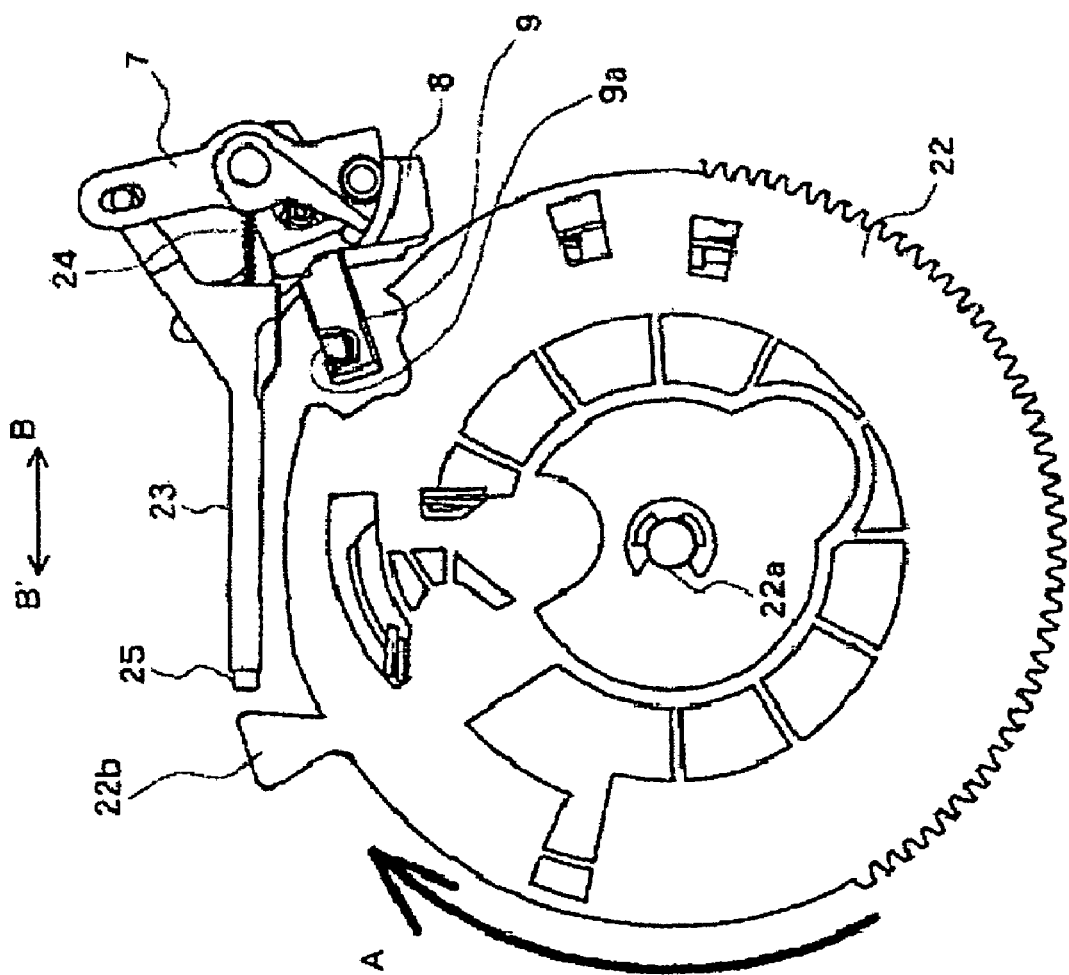
FIG. 19A is an illustration showing a modification of a leader block rotating mechanism of an exemplary embodiment.

FIG. 19A is an illustration showing the modification of the leader block rotating mechanism of the exemplary embodiment. FIG. 19B is an illustration showing the enlarged view of the portion in FIG. 19A. In the case of the modification shown in FIGS. 19A and 19B, a rod pressing portion 25 serving as rod pressing means is set to the front end of a rod 23. A rod reverse spring 24 extends in the rod 23 over its entire length and urges the rod pressing portion 25 to the front end side of the rod 23. The rod 23 is supported by not-illustrated support means so as to be movable only in its axis direction. Moreover, only a capture cam 22b for pressing the rod pressing portion 25 is set to the loader cam gear 22 but a release cam is not set. Other configuration of the leader block rotating mechanism of this modification is the same as the configuration described by referring to FIGS. 12 to 15.

In the case of this modification, when the loader cam gear 22 rotates in the forward direction (A direction), the capture cam 22b of the loader cam gear 22 contacts with the rod pressing portion 25. When the loader cam gear 22 further rotates in the forward direction from the above state, the rod 23 moves in the B direction, rotator lever 7 is rotated, thereby rotator 8 and leader block 9 rotate together, and the hook 9a of the leader block 9 captures a leader pin (not illustrated).

When a force equal to or more than a certain value works on the rod pressing portion 25 in the B direction, the rod reverse spring 24 is further contracted and the rod pressing portion 25 enters the rod 23. Thereby, it is possible to move only the rod pressing portion 25 while holding attitudes of the mechanism components such as the rod 23, rotator lever 7, rotator 8, and leader block 9 at the present positions. That is, in the case of this modification, the rod reverse spring 24 functions as excessive pressure absorbing means. Therefore, even if an excessive force is applied to the, rod pressing portion 25 when the loader cam gear 22 excessively rotates in the A direction, it is possible to prevent a problem that the capture cam 22b of the loader cam gear 22, rod pressing portion 25, and the above mechanism components are damaged or an overload is applied to the driving source of the loader cam gear 22. Namely, the rod pushing portion 25 provided with the rod 23 establishes a contact with the capture cam. The rod reverse spring 24 is served as an excessive-pressure absorbing means and the rod reverse spring 24 is provided in the rod 3. The rod reverse spring 24 pushes the rod pressing portion 25 in the direction towards the capture cam 22b, and deforms when the rod pressing portion 25 is pushed by the capture cam excessively in the opposite direction towards the capture cam.

According to the above configuration, it is possible to decrease a space by a value equivalent to the space required to set the rod lever spring 6 compared to the case of the configuration described by referring to FIGS. 12 to 15. Therefore, it is possible to further downsize a cartridge magnetic tape drive.

Figure 20B:
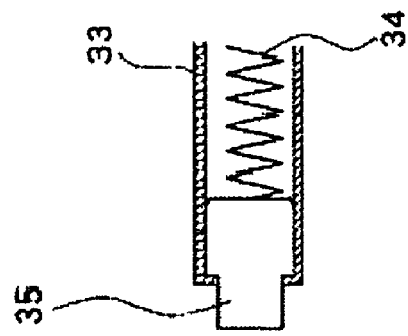
FIG. 20B is an illustration showing the enlarged view of the portion in FIG. 20A.
Figure 20A:
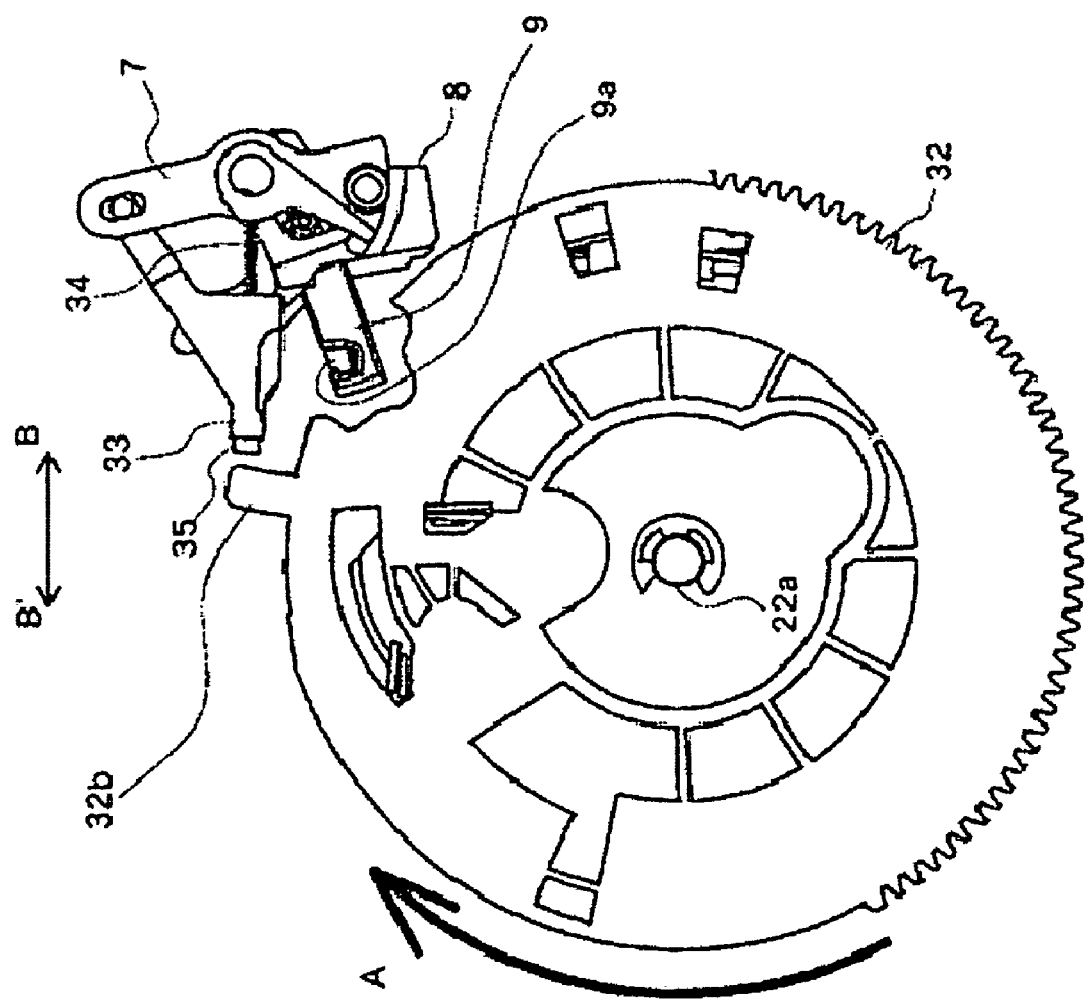
FIG. 20A is an illustration showing another modification of the leader block rotating mechanism.

FIG. 20A is an illustration showing another modification of a leader block rotating mechanism. FIG. 20B is an illustration showing the enlarged view of the portion in FIG. 20A. In the case of the modification shown in FIGS. 20A and 20B, a rod 33 is shortened compared to the rod shown in FIGS. 19A and 19B. Other configuration of the modification shown in FIGS. 20A and 20B is the same as the configuration shown in FIGS. 19A and 19B.

Thereby, it is possible to decrease the distance between the loader cam gear 32 and the threader drive gear 10 (refer to FIG. 12) and further downsize a cartridge magnetic tape drive.

While this invention has been described with reference to illustrative embodiments, this description is not intended to be construed in a limiting sense. Various modifications of the illustrative embodiments as well as other embodiments of the invention will be apparent to persons skilled in the art upon reference to this description. It is, therefore, contemplated that the appended claims will cover any such modifications or embodiments as fall within the true scope of the invention.

Further, the inventor's intent is to retain all equivalents of the claimed invention even if the clams are amended during prosecution.

What is claimed is:

1. An apparatus for threading a tape from a cartridge comprising:
    a leader block rotating to capture a coupling element of the tape;
    a rod linearly moving to rotate said leader block; and
    a loader cam gear moving said rod, wherein a cam is provided with said loader cam gear, and said cam moves said rod so that said leader block can release said coupling element when said loader cam gear rotates in a direction opposite to a capture direction.

2. The apparatus of claim 1, further comprising:
    another cam provided with said loader cam gear, said another cam moves said rod so that said leader block can capture said coupling element when said loader cam gear rotates in the capture direction.

3. The apparatus of claim 2, further comprising:
    an excessive-pressure absorbing portion absorbing the pressure when said another cam pushes said rod.

4. The apparatus of claim 3, further comprising:
a rod lever provided between said rod and said another cam, wherein
said rod lever deforms said excessive-pressure absorbing portion when said another cam pushes said rod lever excessively.

5. The apparatus of claim 1, wherein:
said rod is linearly movable in the direction of an axis of said rod.

6. The apparatus of claim 5, further comprising:
a threader drive gear moving said leader block,
wherein said rod is provided between said loader cam gear and said threader drive gear.

7. An apparatus for threading a tape from a cartridge comprising:
first means for rotating to capture a coupling element of the tape;
second means for moving linearly to rotate said first means; and
third means for moving said second means, a cam being provided with said third means, said cam moving said second means so that said first means can release said coupling element when said third means rotates in a direction opposite to a capture direction.

8. An apparatus for threading a tape from a cartridge comprising:
a leader block on which a hook portion is formed, said hook portion capturing a leader pin of a magnetic tape;
a rotator holding said leader block positioned to a capture position and rotating said leader block;
a rotator lever rotating together with said rotator;
a rod connected to the front end of said rotator lever to move said rotator lever; and
a loader cam gear moving said rod, wherein
said rod is movable in a linear direction, a cam is provided with said loader cam gear, and said cam moves said rod so that said leader block can release said leader pin when said loader cam tear rotates in a direction opposite to a capture direction.

9. The leader block rotating mechanism of a cartridge magnetic tape drive of claim 8, further comprising:
a rod pressing portion movable for the rod, said rod pressing portion being set to the rod;
another cam contacting with said rod pressing portion when said the loader cam gear rotates in a forward direction pressing said rod pressing portion to move the rod in the capture direction, said another cam being set to the outer periphery of said loader cam gear; and
an excessive-pressure absorbing portion being set to said rod, said excessive-pressure absorbing portion being elastically deformed when said rod pressing portion is excessively pressed by said another cam.

10. The leader block rotating mechanism of a cartridge magnetic tape drive of claim 9,
wherein said cam is set to an outer periphery of said loader cam gear, said second cam contacting with said rod pressing portion when said loader cam gear rotates in a reverse direction and presses said rod pressing portion to move said rod in a release direction.

11. The leader block rotating mechanism of a cartridge magnetic tape drive of claim 9, wherein
said rod pressing portion comprises a rod lever rotatably set to the rod and said excessive-pressure absorbing portion comprises a rod lever spring to be elastically deformed when said rod lever is excessively pressed by said another cam and rotated.

12. The leader black rotating mechanism of a cartridge magnetic tape drive of claim 8 wherein
said rod has a portion extending along a linear axis and said linear direction is said axis direction.

* * * * *